United States Patent
Lu et al.

(10) Patent No.: US 9,591,318 B2
(45) Date of Patent: Mar. 7, 2017

(54) MULTI-LAYER ENCODING AND DECODING

(75) Inventors: Mei-Hsuan Lu, Bellevue, WA (US); Ming-Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 13/235,217

(22) Filed: Sep. 16, 2011

(65) Prior Publication Data

US 2013/0070859 A1    Mar. 21, 2013

(51) Int. Cl.
*H04N 19/30* (2014.01)
*H04N 19/39* (2014.01)

(52) U.S. Cl.
CPC ............. *H04N 19/39* (2014.11); *H04N 19/30* (2014.11)

(58) Field of Classification Search
CPC ................................. H04N 7/26; H04N 19/39
USPC .......................................................... 375/240
See application file for complete search history.

(56) References Cited

U.S. PATENT DOCUMENTS

| | | |
|---|---|---|
| 4,142,071 A | 2/1979 | Croisier et al. |
| 4,216,354 A | 8/1980 | Esteban et al. |
| 4,464,783 A | 8/1984 | Beraud et al. |
| 5,243,420 A | 9/1993 | Hibi |
| 5,381,143 A | 1/1995 | Shimoyoshi et al. |
| 5,416,521 A | 5/1995 | Chujoh et al. |
| 5,418,570 A | 5/1995 | Ueno et al. |
| 5,436,665 A | 7/1995 | Ueno et al. |
| 5,454,011 A | 9/1995 | Shimoyoshi |
| 5,463,424 A | 10/1995 | Dressler |
| 5,537,440 A | 7/1996 | Eyuboglu et al. |

(Continued)

FOREIGN PATENT DOCUMENTS

| | | |
|---|---|---|
| EP | 0 909 094 | 4/1999 |
| EP | 1 195 992 | 4/2002 |

(Continued)

OTHER PUBLICATIONS

U.S. Appl. No. 60/341,674, filed Dec. 17, 2001, Lee et al.

(Continued)

*Primary Examiner* — Jay Au Patel
*Assistant Examiner* — Irfan Habib
(74) *Attorney, Agent, or Firm* — Monica Adjemian; Tom Wong; Micky Minhas

(57) ABSTRACT

Innovations described herein provide a generic encoding and decoding framework that includes some features of simulcast and some features of scalable video coding. For example, a bitstream multiplexer multiplexes component bitstreams into a multi-layer encoding (MLE) bitstream that provides temporal scalability, spatial resolution scalability and/or signal to noise ratio scalability. Each of the component bitstreams provides an alternative version of input video, and a given component bitstream can be a non-scalable bitstream or scalable bitstream. The multiplexer follows composition rules for the MLE bitstream and may rewrite values of certain syntax elements of component bitstreams using an approach that avoids bit shifting operations. A corresponding demultiplexer receives an MLE bitstream that includes component bitstreams and demultiplexes at least part of at least one of the component bitstreams from the MLE bitstream, following decomposition rules for the demultiplexing.

21 Claims, 18 Drawing Sheets

(56) References Cited

U.S. PATENT DOCUMENTS

| | | | |
|---|---|---|---|
| 5,541,852 A | 7/1996 | Eyuboglu et al. | |
| 5,544,266 A | 8/1996 | Koppelmans et al. | |
| 5,617,142 A | 4/1997 | Hamilton | |
| 5,623,424 A | 4/1997 | Azadegan et al. | |
| 5,659,660 A | 8/1997 | Plenge et al. | |
| 5,677,735 A * | 10/1997 | Ueno | H04N 19/105 348/699 |
| 5,835,495 A | 11/1998 | Ferriere | |
| 5,970,173 A | 10/1999 | Lee et al. | |
| 5,986,712 A * | 11/1999 | Peterson | H04N 19/159 375/240.14 |
| 5,995,151 A | 11/1999 | Naveen et al. | |
| 6,044,089 A | 3/2000 | Ferriere | |
| 6,084,909 A | 7/2000 | Chiang et al. | |
| 6,192,075 B1 | 2/2001 | Jeng | |
| 6,192,154 B1 | 2/2001 | Rajagopalan et al. | |
| 6,249,288 B1 | 6/2001 | Campbell | |
| 6,259,741 B1 | 7/2001 | Chen et al. | |
| 6,278,691 B1 | 8/2001 | Ohyama et al. | |
| 6,278,735 B1 | 8/2001 | Mohsenian | |
| 6,370,502 B1 | 4/2002 | Wu et al. | |
| 6,393,059 B1 | 5/2002 | Sugiyama | |
| 6,404,814 B1 * | 6/2002 | Apostolopoulos | H04N 19/172 375/240.05 |
| 6,426,977 B1 | 7/2002 | Lee et al. | |
| 6,434,197 B1 | 8/2002 | Wang et al. | |
| 6,463,414 B1 | 10/2002 | Su et al. | |
| 6,466,623 B1 | 10/2002 | Youn et al. | |
| 6,496,216 B2 | 12/2002 | Feder | |
| 6,496,868 B2 | 12/2002 | Krueger et al. | |
| 6,504,494 B1 | 1/2003 | Dyas et al. | |
| 6,507,615 B1 | 1/2003 | Tsujii et al. | |
| 6,522,693 B1 | 2/2003 | Lu et al. | |
| 6,526,099 B1 | 2/2003 | Christopoulos et al. | |
| 6,529,552 B1 | 3/2003 | Tsai et al. | |
| 6,647,061 B1 | 11/2003 | Panusopone et al. | |
| 6,650,705 B1 * | 11/2003 | Vetro | G06T 9/20 375/240.08 |
| 6,678,654 B2 | 1/2004 | Zinser, Jr. et al. | |
| 6,728,317 B1 * | 4/2004 | Demos | H04N 5/14 348/E5.108 |
| 6,757,648 B2 | 6/2004 | Chen et al. | |
| 6,823,008 B2 | 11/2004 | Morel | |
| 6,925,501 B2 * | 8/2005 | Wang | H04N 21/23435 375/240.1 |
| 6,931,064 B2 | 8/2005 | Mori et al. | |
| 6,934,334 B2 | 8/2005 | Yamaguchi et al. | |
| 6,937,653 B2 | 8/2005 | Song et al. | |
| 6,944,224 B2 | 9/2005 | Zhao | |
| 6,961,377 B2 | 11/2005 | Kingsley | |
| 6,963,347 B1 | 11/2005 | Selvaggi et al. | |
| 7,027,982 B2 | 4/2006 | Chen et al. | |
| 7,039,116 B1 | 5/2006 | Zhang et al. | |
| 7,058,127 B2 | 6/2006 | Lu et al. | |
| 7,068,718 B2 | 6/2006 | Kim et al. | |
| 7,085,322 B2 | 8/2006 | Ngai et al. | |
| 7,116,714 B2 | 10/2006 | Hannuksela | |
| 7,142,601 B2 | 11/2006 | Kong et al. | |
| 7,292,634 B2 | 11/2007 | Yamamoto et al. | |
| 7,295,612 B2 | 11/2007 | Haskell | |
| 7,319,720 B2 | 1/2008 | Abrams, Jr. | |
| 7,336,720 B2 | 2/2008 | Martemyanov et al. | |
| 7,343,291 B2 * | 3/2008 | Thumpudi | G10L 19/24 704/500 |
| 7,346,106 B1 | 3/2008 | Jiang et al. | |
| 7,352,808 B2 | 4/2008 | Ratakonda et al. | |
| 7,643,422 B1 | 1/2010 | Covell et al. | |
| 7,694,075 B1 | 4/2010 | Feekes, Jr. | |
| 7,773,672 B2 | 8/2010 | Prieto et al. | |
| 7,840,078 B2 | 11/2010 | Segall | |
| 7,844,992 B2 | 11/2010 | Boyce et al. | |
| 7,885,341 B2 | 2/2011 | Chen et al. | |
| 7,936,820 B2 | 5/2011 | Watanabe et al. | |
| 8,130,828 B2 * | 3/2012 | Hsu | H04N 19/126 348/27 |
| 2002/0036707 A1 | 3/2002 | Gu | |
| 2002/0080877 A1 | 6/2002 | Lu et al. | |
| 2002/0090027 A1 | 7/2002 | Karczewicz et al. | |
| 2002/0131492 A1 | 9/2002 | Yokoyama | |
| 2002/0136298 A1 | 9/2002 | Anantharamu | |
| 2002/0172154 A1 | 11/2002 | Uchida et al. | |
| 2002/0181584 A1 | 12/2002 | Alexandre et al. | |
| 2003/0035480 A1 | 2/2003 | Schaar et al. | |
| 2003/0058931 A1 | 3/2003 | Zhang et al. | |
| 2003/0185298 A1 | 10/2003 | Alvarez et al. | |
| 2003/0206597 A1 | 11/2003 | Kolarov et al. | |
| 2003/0227974 A1 | 12/2003 | Nakamura et al. | |
| 2004/0117427 A1 | 6/2004 | Allen et al. | |
| 2004/0125877 A1 | 7/2004 | Chang | |
| 2004/0136457 A1 | 7/2004 | Funnell et al. | |
| 2004/0165667 A1 | 8/2004 | Lennon et al. | |
| 2004/0234142 A1 | 11/2004 | Chang et al. | |
| 2004/0264489 A1 | 12/2004 | Klemets et al. | |
| 2005/0025234 A1 | 2/2005 | Kato et al. | |
| 2005/0041740 A1 | 2/2005 | Sekiguchi | |
| 2005/0053157 A1 | 3/2005 | Lillevold | |
| 2005/0075869 A1 | 4/2005 | Gersho et al. | |
| 2005/0084007 A1 | 4/2005 | Lightstone et al. | |
| 2005/0123058 A1 | 6/2005 | Greenbaum et al. | |
| 2005/0165611 A1 * | 7/2005 | Mehrotra | G10L 19/035 704/500 |
| 2005/0169545 A1 | 8/2005 | Ratakonda et al. | |
| 2005/0175091 A1 | 8/2005 | Puri et al. | |
| 2005/0180511 A1 | 8/2005 | Arafune et al. | |
| 2005/0195899 A1 * | 9/2005 | Han | H04N 21/234327 375/240.21 |
| 2005/0201469 A1 | 9/2005 | Sievers et al. | |
| 2005/0207492 A1 * | 9/2005 | Rovati et al. | 375/240.16 |
| 2005/0228854 A1 | 10/2005 | Steinheider et al. | |
| 2005/0232497 A1 | 10/2005 | Yogeshwar et al. | |
| 2006/0002479 A1 * | 1/2006 | Fernandes | H04N 19/61 375/240.25 |
| 2006/0114995 A1 | 6/2006 | Robey et al. | |
| 2006/0120610 A1 | 6/2006 | Kong et al. | |
| 2006/0126726 A1 | 6/2006 | Lin et al. | |
| 2006/0126744 A1 | 6/2006 | Peng et al. | |
| 2006/0159169 A1 | 7/2006 | Hui et al. | |
| 2006/0215754 A1 | 9/2006 | Buxton et al. | |
| 2006/0222078 A1 | 10/2006 | Raveendran | |
| 2006/0239343 A1 * | 10/2006 | Mohsenian | H04N 19/196 375/240.01 |
| 2006/0245491 A1 | 11/2006 | Jam et al. | |
| 2006/0248516 A1 | 11/2006 | Gordon | |
| 2006/0248563 A1 * | 11/2006 | Lee | H04H 20/33 725/117 |
| 2006/0262844 A1 | 11/2006 | Chin | |
| 2007/0039028 A1 | 2/2007 | Bar | |
| 2007/0053444 A1 | 3/2007 | Shibata et al. | |
| 2007/0058718 A1 | 3/2007 | Shen et al. | |
| 2007/0058729 A1 * | 3/2007 | Yoshinari | G11B 27/034 375/240.25 |
| 2007/0071105 A1 | 3/2007 | Tian et al. | |
| 2007/0140352 A1 | 6/2007 | Bhaskaran et al. | |
| 2007/0153906 A1 | 7/2007 | Petrescu et al. | |
| 2007/0160128 A1 | 7/2007 | Tian et al. | |
| 2007/0223564 A1 | 9/2007 | Bruls et al. | |
| 2007/0230564 A1 * | 10/2007 | Chen | H04N 21/234327 375/240.01 |
| 2007/0280349 A1 | 12/2007 | Prieto et al. | |
| 2008/0007438 A1 | 1/2008 | Segall et al. | |
| 2008/0046939 A1 | 2/2008 | Lu et al. | |
| 2008/0137736 A1 | 6/2008 | Richardson et al. | |
| 2008/0144723 A1 | 6/2008 | Chen et al. | |
| 2008/0151101 A1 | 6/2008 | Tian et al. | |
| 2008/0165844 A1 | 7/2008 | Karczewicz | |
| 2008/0165864 A1 * | 7/2008 | Eleftheriadis | H04N 21/23432 375/240.29 |
| 2008/0187046 A1 | 8/2008 | Joch | |
| 2008/0247460 A1 | 10/2008 | Kang et al. | |
| 2008/0259921 A1 | 10/2008 | Nadarajah | |
| 2009/0003452 A1 | 1/2009 | Au et al. | |

(56) References Cited

U.S. PATENT DOCUMENTS

| | | | |
|---|---|---|---|
| 2009/0012982 | A1 | 1/2009 | Merchia et al. |
| 2009/0028247 | A1* | 1/2009 | Suh ................. H04H 20/30 |
| | | | 375/240.25 |
| 2009/0033739 | A1 | 2/2009 | Sarkar et al. |
| 2009/0034629 | A1 | 2/2009 | Suh et al. |
| 2009/0037959 | A1* | 2/2009 | Suh ............ H04N 21/4345 |
| | | | 725/62 |
| 2009/0074074 | A1* | 3/2009 | Au ................. H04N 19/176 |
| | | | 375/240.18 |
| 2009/0110060 | A1 | 4/2009 | Cortes et al. |
| 2009/0147859 | A1 | 6/2009 | McGowan et al. |
| 2009/0176454 | A1 | 7/2009 | Chen et al. |
| 2009/0201990 | A1 | 8/2009 | Leprovost et al. |
| 2009/0219993 | A1 | 9/2009 | Bronstein et al. |
| 2009/0225870 | A1* | 9/2009 | Narasimhan ........... H04N 7/52 |
| | | | 375/240.26 |
| 2009/0244633 | A1 | 10/2009 | Johnston |
| 2009/0279605 | A1 | 11/2009 | Holcomb et al. |
| 2009/0282162 | A1 | 11/2009 | Mehrotra et al. |
| 2010/0086048 | A1* | 4/2010 | Ishtiaq .............. H04N 19/105 |
| | | | 375/240.16 |
| 2010/0091837 | A1 | 4/2010 | Zhu et al. |
| 2010/0091888 | A1 | 4/2010 | Nemiroff |
| 2010/0142622 | A1 | 6/2010 | Le Leannec et al. |
| 2010/0189179 | A1 | 7/2010 | Gu et al. |
| 2010/0189183 | A1 | 7/2010 | Gu et al. |
| 2010/0208795 | A1* | 8/2010 | Hsiang ............... H04N 19/61 |
| | | | 375/240.2 |
| 2010/0272171 | A1 | 10/2010 | Xu |
| 2010/0316126 | A1 | 12/2010 | Chen et al. |
| 2010/0316134 | A1 | 12/2010 | Chen et al. |
| 2011/0188577 | A1 | 8/2011 | Kishore et al. |
| 2011/0305273 | A1 | 12/2011 | He et al. |
| 2012/0044999 | A1* | 2/2012 | Kim .................. H04N 19/70 |
| | | | 375/240.25 |
| 2012/0051432 | A1* | 3/2012 | Fernandes ............ H04N 19/172 |
| | | | 375/240.16 |
| 2012/0056981 | A1 | 3/2012 | Tian et al. |
| 2012/0219069 | A1* | 8/2012 | Lim et al. ................ 375/240.25 |
| 2013/0003833 | A1 | 1/2013 | Jang et al. |
| 2013/0034170 | A1 | 2/2013 | Chen et al. |
| 2013/0044811 | A1* | 2/2013 | Kim ......................... 375/240.12 |
| 2014/0133547 | A1* | 5/2014 | Tanaka ............. H04N 19/00545 |
| | | | 375/240.02 |

FOREIGN PATENT DOCUMENTS

| | | |
|---|---|---|
| JP | 03032088 | 2/2000 |
| JP | 2002-152752 | 5/2002 |
| JP | 3317327 | 8/2002 |
| JP | 2003-259307 | 9/2003 |
| JP | 2005-252555 | 9/2005 |
| JP | 2007-036666 | 2/2007 |
| KR | 10-2005-0089720 | 9/2005 |
| KR | 10-2006-0132890 | 12/2006 |
| KR | 2007-295423 | 11/2007 |
| KR | 10-2008-0102141 | 11/2008 |
| WO | WO 01/95633 | 12/2001 |
| WO | WO 02/054774 A2 | 7/2002 |
| WO | WO 2004/004359 | 1/2004 |
| WO | WO 2004/025405 | 3/2004 |
| WO | WO 2006/096612 | 9/2006 |
| WO | WO 2006/134110 | 12/2006 |
| WO | WO 2010/088030 | 8/2010 |

OTHER PUBLICATIONS

U.S. Appl. No. 60/488,710, filed Jul. 18, 2003, Srinivasan et al.
U.S. Appl. No. 60/501,081, filed Sep. 7, 2003, Srinivasan et al.
U.S. Appl. No. 60/501,133, filed Sep. 7, 2003, Holcomb et al.
Akramullah et al., "Parallelization of MPEG-2 Video Encoder for Parallel and Distributed Computing Systems," *IEEE*, pp. 834-837 (Aug. 1995).
Asbun et al., "Very Low Bit Rate Wavelet-Based Scalable Video Compression," *Proc. Int'l Conf. on Image Processing*, vol. 3, pp. 948-952 (Oct. 1998).
Assuncao et al., "A Frequency-Domain Video Transcoder for Dynamic Bit-Rate Reduction of MPEG-2 Bit Streams," IEEE Transactions on Circuits and Systems for Video Technology, vol. 8, No. 8, pp. 953-967 (Dec. 1998).
Assuncao et al., "Buffer Analysis and Control in CBR Video Transcoding," *IEEE Transactions on Circuits and Systems for Video Technology*, vol. 10, No. 1, pp. 83-92 (Feb. 2000).
Assuncao et al., "Transcoding of Single-Layer MPEG Video Into Lower Rates," *IEE Proc.-Vis. Image Signal Process.*, vol. 144, No. 6, pp. 377-383 (Dec. 1997).
ATI Technologies, Inc., "Introduction to H.264," 6 pp. (month unknown, 2005).
Braun et al., "Motion-Compensating Real-Time Format Converter for Video on Multimedia Displays," *Proceedings IEEE 4th International Conference on Image Processing (ICIP-97)*, vol. I, pp. 125-128 (Oct. 1997).
Brightwell et al., "Flexible Switching and Editing of MPEG-2 Video Bitstreams," *IBC-97*, 11 pp. (Sep. 1997).
Chang et al., "Real-Time Content-Based Adaptive Streaming of Sports Videos," *IEEE*, pp. 139-146 (Jul. 2001).
Chen et al., "Bandwidth-Efficient Encoder Framework for H.264/AVC Scalable Extension," *IEEE Int'l Symp. on Multimedia Workshops*, pp. 401-406 (2007).
Chen et al., "Implementation of H.264 Encoder and Decoder on Personal Computers," *Journal of Visual Comm. and Image Representation*, 19 pp. (Apr. 2006).
Chen, "Synchronization and Control of Multi-threads for MPEG-4 Video Decoder," *IEEE 1999 Int'l Conf. on Consumer Electronics*, pp. 298-299 (Jun. 1999).
Crooks, "Analysis of MPEG Encoding Techniques on Picture Quality," *Tektronix Application Note*, 12 pp. (Jun. 1998).
Dawson, "Coding for Multiple Cores on Xbox 360 and Microsoft Windows," 8 pp. (Aug. 2006) [Downloaded from the Internet on Jan. 22, 2007].
Detti et al., "SVEF: an Open-Source Experimental Evaluation Framework for H.264 Scalable Video Streaming," *IEEE Symp. on Computers and Communications*, pp. 36-41 (2009).
Dipert, "Image Compression Article Addendum," *EDN Magazine*, 8 pp. (Jun. 18, 1998).
Duffy, "CLR Inside Out: Using Concurrency for Scalability," *MSDN Magazine*, 11 pp. (Sep. 2006) [Downloaded from the Internet on Jan. 22, 2007].
Flordal et al., "Accelerating CABAC Encoding for Multi-standard Media with Configurability," IEEE Xplore, 8 pp. (Apr. 2006).
Fogg, "Question That Should Be Frequently Asked About MPEG," Version 3.8, 46 pp. (Apr. 1996).
foldoc.org, "priority scheduling," 1 p. (No date) [Downloaded from the Internet on Jan. 26, 2007].
foldoc.org, "multitasking," 1 p. (Document dated Apr. 24, 1998) [Downloaded from the Internet on Jan. 26, 2007].
Gerber et al., "Optimizing Video Encoding using Threads and Parallelism: Part 1—Threading a video codec," 3 pp., downloaded from Embedded.com, (Dec. 2009).
Gibson et al., *Digital Compression for Multimedia*, "Chapter 4: Quantization," Morgan Kaufman Publishers, Inc., pp. 113-138 (Jan. 1998).
Gibson et al., *Digital Compression for Multimedia*, "Chapter 7: Frequency Domain Coding," Morgan Kaufman Publishers, Inc., pp. 227-262 (Jan. 1998).
Gill, "Tips and Tricks for Encoding Long Format Content with Windows Media Encoder," downloaded from World Wide Web, 12 pp. (document marked Aug. 2003).
Hamming, *Digital Filters*, Second Edition, "Chapter 2: The Frequency Approach," Prentice-Hall, Inc., pp. 19-31 (Jan. 1983).
Haskell et al., *Digital Video: An Introduction to MPEG-2*, Table of Contents, International Thomson Publishing, 6 pp. (1997).
Huang et al., "Optimal Control of Multiple Bit Rates for Streaming Media," *Proc. Picture Coding Symposium*, 4 pp. (Dec. 2004).

(56) References Cited

OTHER PUBLICATIONS

Intel Corp., "Intel's Next Generation Integrated Graphics Architecture—Intel® Graphics Media Accelerator X3000 and 3000," 14 pp. (Jul. 2006).
ISO/IEC, "ISO/IEC 11172-2, Information Technology—Coding of Moving Pictures and Associated Audio for Digital Storage Media at up to about 1.5 Mbit/s—Part 2: Video," 112 pp. (Aug. 1993).
ISO/IEC, "JTC1/SC29/WG11 N2202, Information Technology—Coding of Audio-Visual Objects: Visual, ISO/IEC 14496-2," 329 pp. (Mar. 1998).
ISO/IEC MPEG-2 Test Model 5, "TM5 Overview," 10 pp. (Mar. 1993).
Ito et al., "Rate control for video coding using exchange of quantization noise and signal resolution," *Electronics & Communications in Japan*, Part II, Hoboken, New Jersey, vol. 83, No. 1, Jan. 1, 2000, pp. 33-43.
ITU-T, "ITU-T Recommendation H.261, Video Codec for Audio-visual Services at p x 64 kbits," 25 pp. (Mar. 1993).
ITU-T, "ITU-T Recommendation H.262, Information Technology—Generic Coding of Moving Pictures and Associated Audio Information: Video," 205 pp. (Jul. 1995).
ITU-T, "ITU-T Recommendation H.263, Video Coding for Low Bit Rate Communication," 162 pp. (Feb. 1998).
ITU-T, "ITU-T Recommendation H.264, Advanced video coding for generic audiovisual services," 676 pp. (Mar. 2010).
Jacobs et al., "Thread-Parallel MPEG-2, MPEG-4 and H.264 Video Encoders for SoC Multi-Processor Architectures," *IEEE Trans. on Consumer Electronics*, vol. 52, No. 1, pp. 269-275 (Feb. 2006).
Joint Video Team (JVT) of ISO/IEC MPEG & ITU-T VCEG, "Joint Final Committee Draft (JFCD) of Joint Video Specification," JVT-D157, 207 pp. (Aug. 2002).
Kamikura et al., "Global brightness-variation compensation for video coding" *IEEE Trans. on Circuits and Systems for Video Technology*, vol. 8, No. 8, pp. 988-1000 (Dec. 1998).
Kari et al., "Intensity controlled motion compensation," *Data Compression Conference Proc.*, pp. 249-258, (Mar. 30-Apr. 1, 1998).
Keesman et al., "Transcoding of MPEG Bitstreams," *Signal Processing: Image Communication 8*, pp. 481-500 (Sep. 1996).
Khan et al., "Architecture Overview of Motion Vector Reuse Mechanism in MPEG-2 Transcoding," Technical Report TR2001-01-01, 7 pp. (Jan. 2001).
Kim et al., "Multi-thread VLIW processor architecture for HDTV decoding," *IEEE 2000 Custom Integrated Circuits Conf.*, pp. 559-562 (May 2000).
Knee et al., "Seamless Concatenation—A 21st Century Dream," 13 pp. (Jun. 1997).
Kofler et al., "Improving IPTV Services by H.264/SVC Adaptation and Traffic Control," *IEEE Int'l Symp. on Broadband Multimedia Systems and Broadcasting*, 6 pp. (2009).
Lei et al., "Rate Adaptation Transcoding for Precoded Video Streams," 13 pp. (month unknown, 2000).
Leventer et al., "Towards Optimal Bit-Rate Control in Video Transcoding," *ICIP*, pp. 265-268 (Sep. 2003).
Loomis et al., "VC-1 Technical Overview," 7 pp. (Apr. 2006) [Downloaded from the Internet on Jan. 24, 2007].
Microsoft Corporation, "Microsoft Debuts New Windows Media Player 9 Series, Redefining Digital Media on the PC," 4 pp. (Sep. 4, 2002) [Downloaded from the World Wide Web on May 14, 2004].
Microsoft Corporation, "Windows Media and Web Distribution for Broadcasters," downloaded from the World Wide Web, 4 pp. (document marked Sep. 2007).
Microsoft Corporation, "Microsoft Lync—Unified Communication Specification for H.264 AVC and SVC UCConfig Modes V 1.1," 37 pp. (Jun. 2011).
Microsoft Corporation, "Microsoft Lync—Unified Communication Specification for H.264 AVC and SVC Encoder Implementation V 1.01," 32 pp. (Jan. 2011).
Miyata et al., "A novel MPEG-4 rate control method with spatial resolution conversion for low bit-rate coding," *Conference Proceedings / IEEE International Symposium on Circuits and Systems (ISCAS)*, Kobe, Japan, May 23-26, 2005, pp. 4538-4541.
Mook, "Next-Gen Windows Media Player Leaks to the Web," *BetaNews*, 17 pp. (Jul. 2002) [Downloaded from the World Wide Web on Aug. 8, 2003].
Moshnyaga, "An Implementation of Data Reusable MPEG Video Coding Scheme," *Proceedings of World Academy of Science, Engineering and Technology*, vol. 2, pp. 193-196 (Jan. 2005).
Moshnyaga, "Reduction of Memory Accesses in Motion Estimation by Block-Data Reuse," *ICASSP '02 Proceedings, IEEE International Conference on Acoustics, Speech, and Signal Processing*, vol. 3, pp. 111-3128-111-3131 (May 2002).
Nasim et al., "Architectural Optimizations for Software-Bassed MPEG4 Video Encoder," *13th European Signal Processing Conference: EUSIPCO '2005*, 4 pp. (Sep. 2005).
Nuntius Systems, Inc., "H.264—a New Technology for Video Compression", downloaded from the World Wide Web, 4 pp. (document marked Mar. 2004).
Oehring et al., "MPEG-2 Video Decompression on Simultaneous Multithreaded Multimedia," *Int. Conf. on Parallel Architectures and Compilation Techniques (PACT '99)*, Newport Beach, CA (Oct. 1999).
Ortiz Murillo et al., "Towards User-driven Adaptation of H.264/SVC Streams," *European Conf. on Interactive TV and Video*, 4 pp. (2010).
Ostermann et al., "Video Coding with H.264/AVC: Tools, Performance, and Complexity," *IEEE Circuits and Systems Magazine*, pp. 7-28 (Aug. 2004).
Ozcelebi et al., "Optimal rate and input format control for content and context adaptive video streaming," *2004 International Conference on Image Processing(ICIP)*, Singapore, Oct. 24-27, 2004, pp. 2043-2046.
Ozcelebi et al., "Optimal rate and input format control for content and context adaptive streaming of sports videos," *2004 IEEE 6th Workshop on Multimedia Signal Processing*, Siena, Italy, Sep. 29-Oct. 1, 2004, pp. 502-505.
Printouts of FTP directories from http://ftp3.itu.ch, 8 pp. [Downloaded from the World Wide Web on Sep. 20, 2005].
Reader, "History of MPEG Video Compression—Ver. 4.0," 99 pp. [Document marked Dec. 16, 2003].
RealNetworks, Inc., "Chapter 5: Producing Video," downloaded from the World Wide Web, 22 pp. (document marked 2004).
Reed et al., "Optimal multidimensional bit-rate control for video communication," *IEEE Transactions on Image Processing*, vol. 11, No. 8, pp. 873-874 (Aug. 1, 2002).
Roy et al., "Application Level Hand-off Support for Mobile Media Transcoding Sessions," *Proceedings of the 12th International Workshop on Network and Operating Systems Support for Digital Audio and Video*, 22 pp. (May 2002).
Sambe et al., "High-speed Distributed Video Transcoding for Multiple Rates and Formats," *IEICE Trans on Information and Systems*, vol. E88-D, Issue 8, pp. 1923-1931 (Aug. 2005).
Schwarz et al., "Overview of the Scalable Video Coding Extension of the H.264/AVC Standard," *IEEE Trans. on Circuits and Systems for Video Technology*, vol. 17, No. 9, pp. 1103-1120 (Sep. 2007).
Senda et al., "A Realtime Software MPEG Transcoder Using a Novel Motion Vector Reuse and a SIMD Optimization Techniques," *ICASSP '99 Proceedings, 1999 IEEE International Conference on Acoustics, Speech, and Signal Processing*, vol. 4, pp. 2359-2362 (Mar. 1999).
Shanableh et al., "Heterogeneous Video Transcoding to Lower Spatio-Temporal Resolutions and Different Encoding Formats," *IEEE Transactions on Multimedia*, 31 pp. (Jun. 2000).
Shanableh et al., "Transcoding of Video Into Different Encoding Formats," *ICASSP-2000 Proceedings*, vol. IV of VI, pp. 1927-1930 (Jun. 2000).
SMPTE, "Proposed SMPTE Standard for Television: VC-1 Compressed Video Bitstream Format and Decoding Process," SMPTE 421M, pp. i-xx, 5-7, Aug. 23-27, 2005.
SMPTE, "SMPTE 327M-2000—MPEG-2 Video Recoding Data Set," 9 pp. (Jan. 2000).

(56) References Cited

OTHER PUBLICATIONS

Sullivan et al., "DirectX Video Acceleration (DXVA) Specification for H.264/MPEG-4 Scalable Video Coding (SVC) Off-Host VLD Mode Decoding," 24 pp. (Jun. 2012).
Sullivan, "DirectX Video Acceleration Specification for H.264/AVC Decoding," 66 pp. (Dec. 2007, updated Dec. 2010).
Sullivan et al., "DirectX Video Acceleration Specification for H.264/MPEG-4 AVC Multiview Video Coding (MVC), Including the Stereo High Profile," 17 pp. (Mar. 2011).
Sun et al., "Architectures for MPEG Compressed Bitstream Scaling," *IEEE Transactions on Circuits and Systems for Video Technology*, vol. 6, No. 2, pp. 191-199 (Apr. 1996).
Sun et al., "Lossless Coders," *Digital Signal Processing for Multimedia Systems*, Chapter 15, pp. 385-416 (Mar. 1999).
Swann et al., "Transcoding of MPEG-II for Enhanced Resilience to Transmission Errors," *Cambridge University Engineering Department*, Cambridge, UK, pp. 1-4 (Sep. 1996).
Takahashi et al., "Motion Vector Synthesis Algorithm for MPEG2-to-MPEG4 Transcoder," *Proc. of SPIE*, vol. 4310, pp. 872-882 (Jan. 2001).
Tan et al., "On the Methods and Performances of Rational Downsizing Video Transcoding," *Signal Processing: Image Communication 19*, pp. 47-65 (Jan. 2004).
Tektronix Application Note, "Measuring and Interpreting Picture Quality in MPEG Compressed Video Content," 8 pp. (2001).
Tsai et al., "Rate-Distortion Model for Motion Prediction Efficiency in Scalable Wavelet Video Coding," *17th International Packet Video Workshop*, 9 pp. (May 2009).
Tudor et al., "Real-Time Transcoding of MPEG-2 Video Bit Streams," *BBC R&D*, U.K., 6 pp. (Sep. 1997).
Van Der Tol et al., "Mapping of MPEG-4 decoding on a flexible architecture platform," *Proceedings of the SPIE, Media Processors*, vol. 4674, 13 pp. (Jan. 2002).
Van Der Tol et al., "Mapping of H.264 decoding on a multiprocessor architecture," *Proceedings of the SPIE*, vol. 5022, pp. 707-718 (May 2003).
Vetro et al., "Complexity-Quality Analysis of Transcoding Architectures for Reduced Spatial Resolution," *IEEE Transactions on Consumer Electronics*, 9 pp. (Aug. 2002).
Vishwanath et al., "A VLSI Architecture for Real-Time Hierarchical Encoding/Decoding of Video Using the Wavelet Transform," *Proc. ICASSP*, 5 pp. (Apr. 1994).
Waggoner, "In Depth Microsoft Silverlight," downloaded from the World Wide Web, 94 pp. (document marked 2007).
Watkinson, *The MPEG Handbook*, pp. 275-281 (Nov. 2004).
Werner, "Generic Quantiser for Transcoding of Hybrid Video," *Proc. 1997 Picture Coding Symposium*, Berlin, Germany, 6 pp. (Sep. 1997).
Werner, "Requantization for Transcoding of MPEG-2 Intraframes," *IEEE Transactions on Image Processing*, vol. 8, No. 2, pp. 179-191 (Feb. 1999).
Wiegand et al., "Overview of the H.264/AVC Coding Standard," *IEEE Trans. on Circuits and Systems for Video Technology*, vol. 13, No. 7, pp. 560-576 (Jul. 2003).
Youn et al., "Video Transcoder Architectures for Bit Rate Scaling of H.263 Bit Streams," *ACM Multimedia 1999*, Orlando, Florida, pp. 243-250 (Oct. 1999).
Zhou et al., "Motion Vector Reuse Algorithm to Improve Dual-Stream Video Encoder," *ICSP 2008, 9th International Conference on Signal Processing*, pp. 1283-1286 (Oct. 2008).
Zhu et al., "Rate Control Scheme for Temporal Scalability of H.264/SVC Based on New Rate Distortion Model," *Journal of Convergence Information Technology*, vol. 6, No. 1, pp. 24-33 (Jan. 2011).
Huang et al., "Optimal Coding Rate Control of Scalable and Multi Bit Rate Streaming Media," Microsoft Research Technical Report MSR-TR-2005-47, Apr. 2005 (also appeared in Proc. International Packet Video Workshop (PV 2004), Irvine, CA, Dec. 2004 and in Proc. Picture Coding Symposium (PCS 2004), San Francisco, CA, Dec. 2004, 26 pages.

\* cited by examiner software 180 implementing one or more innovations for multi-layer encoding and/or decoding

Figure 8   800

| NAL unit (type) | Relevant fields in the NAL | Description |
|---|---|---|
| SPS (7) | SPSID = 0 | SPS of stream 180p 15Hz |
| PPS (8) | PPSID = 0, SPSID = 0 | PPS of stream 180p 15Hz |
| Prefix (14) | PRID = 0 | Prefix NAL of stream 180p 15Hz |
| IDR slice (5) | PPSID = 0, POC = 0 | Base layer IDR slice(s) in stream 180p 15Hz |
| Prefix (14) | PRID = 0 | Prefix NAL of stream 180p 15Hz |
| Non-IDR slice (1) | PPSID = 0, POC = 2 | P slice(s) of stream 180p 15Hz |
| Prefix (14) | PRID = 0 | Prefix NAL of stream 180p 15Hz |
| Non-IDR slice (1) | PPSID = 0, POC = 4 | P slice(s) of stream 180p 15Hz |
| ... | ... | ... |

Figure 9   900

| NAL unit (type) | Relevant fields in the NAL | Description |
|---|---|---|
| SPS (7) | SPSID = 0 | SPS of stream 360p 30Hz |
| PPS (8) | PPSID = 0, SPSID = 0 | PPS of stream 360p 30Hz |
| Prefix (14) | PRID = 1, | Prefix NAL of stream 360p 30Hz |
| IDR slice (5) | PPSID = 0, POC = 0 | Base layer IDR slice(s) in stream 360p 30Hz |
| Prefix (14) | PRID = 1 | Prefix NAL of stream 360p 30Hz |
| Non-IDR slice (1) | PPSID = 0, POC = 1 | P slice(s) of stream 360p 30Hz |
| Prefix (14) | PRID = 1 | Prefix NAL of stream 360p 30Hz |
| Non-IDR slice (1) | PPSID = 0, POC = 2 | P slice(s) of stream 360p 30Hz |
| Prefix (14) | PRID = 1 | Prefix NAL of stream 360p 30Hz |
| Non-IDR slice (1) | PPSID = 0, POC = 3 | P slice(s) of stream 360p 30Hz |
| ... | ... | ... |

Figure 10   1000

| NAL unit (type) | Relevant fields in the NAL | Description |
|---|---|---|
| SPS (7) | SPSID = 0 | SPS of stream 720p 30Hz |
| PPS (8) | PPSID = 0, SPSID = 0 | PPS of stream 720p 30Hz |
| Prefix (14) | PRID = 2 | Prefix NAL of stream 720p 30Hz |
| IDR slice (5) | PPSID = 0, POC = 0 | Base layer IDR slice(s) in stream 720p 30Hz |
| Prefix (14) | PRID = 2 | Prefix NAL of stream 720p 30Hz |
| Non-IDR slice (1) | PPSID = 0, POC = 1 | P slice(s) of stream 720p 30Hz |
| Prefix (14) | PRID = 2 | Prefix NAL of stream 720p 30Hz |
| Non-IDR slice (1) | PPSID = 0, POC = 2 | P slice(s) of stream 720p 30Hz |
| Prefix (14) | PRID = 2 | Prefix NAL of stream 720p 30Hz |
| Non-IDR slice (1) | PPSID = 0, POC = 3 | P slice(s) of stream 720p 30Hz |
| ... | ... | ... |

Figure 11     1100

| NAL unit (type) | Relevant fields in the NAL | Description |
|---|---|---|
| SPS (7) | SPSID = 0 | SPS of stream 180p 15Hz |
| PPS (8) | PPSID = 0, SPSID = 0 | PPS of stream 180p 15Hz |
| SPS (7) | SPSID = 1 | SPS of stream 360p 30Hz |
| PPS (8) | PPSID = 1, SPSID = 1 | PPS of stream 360p 30Hz |
| SPS (7) | SPSID = 2 | SPS of stream 720p 30Hz |
| PPS (8) | PPSID = 2, SPSID = 2 | PPS of stream 720p 30Hz |
| Prefix (14) | PRID = 0 | Prefix NAL of stream 180p 15Hz |
| IDR slice (5) | PPSID = 0, POC = 0 | Base layer IDR slice(s) in stream 180p 15Hz |
| Prefix (14) | PRID = 1, | Prefix NAL of stream 360p 30Hz |
| IDR slice (5) | PPSID = 1, POC = 0 | Base layer IDR slice(s) in stream 360p 30Hz |
| Prefix (14) | PRID = 2 | Prefix NAL of stream 720p 30Hz |
| IDR slice (5) | PPSID = 2, POC = 0 | Base layer IDR slice(s) in stream 720p 30Hz |
| Prefix (14) | PRID = 1 | Prefix NAL of stream 360p 30Hz |
| Non-IDR slice (1) | PPSID = 1, POC = 1 | P slice(s) of stream 360p 30Hz |
| Prefix (14) | PRID = 2 | Prefix NAL of stream 720p 30Hz |
| Non-IDR slice (1) | PPSID = 2, POC = 1 | P slice(s) of stream 720p 30Hz |
| Prefix (14) | PRID = 0 | Prefix NAL of stream 180p 15Hz |
| Non-IDR slice (1) | PPSID = 0, POC = 2 | P slice(s) of stream 180p 15Hz |
| Prefix (14) | PRID = 1 | Prefix NAL of stream 360p 30Hz |
| Non-IDR slice (1) | PPSID = 1, POC = 2 | P slice(s) of stream 360p 30Hz |
| Prefix (14) | PRID = 2 | Prefix NAL of stream 720p 30Hz |
| Non-IDR slice (1) | PPSID = 2, POC = 2 | P slice(s) of stream 720p 30Hz |
| ... | ... | ... |

Figure 12      1200

| NAL unit (type) | Relevant fields in the NAL | Description |
|---|---|---|
| SPS (7) | SPSID = 0 | SPS of stream 180p 15Hz |
| PPS (8) | PPSID = 0, SPSID= 0 | PPS of stream 180p 15Hz |
| Prefix (14) | PRID = 0, TID=0 | Prefix NAL of stream 180p 7.5Hz |
| IDR slice (5) | PPSID = 0, POC = 0 | Base layer IDR slice(s) in stream 180p 7.5Hz |
| Prefix (14) | PRID = 1, TID=1 | Prefix NAL of stream 180p 15Hz |
| Non-IDR slice (1) | PPSID = 0, POC = 2 | P slice(s) of stream 180p 15Hz |
| Prefix (14) | PRID = 0, TID=0 | Prefix NAL of stream 180p 7.5Hz |
| Non-IDR slice (1) | PPSID = 0, POC = 4 | P slice(s) of stream 180p 7.5Hz |
| Prefix (14) | PRID = 1, TID=1 | Prefix NAL of stream 180p 15Hz |
| Non-IDR slice (1) | PPSID = 0, POC = 6 | P slice(s) of stream 180p 15Hz |
| ... | ... | ... |

Figure 13      1300

| NAL unit (type) | Relevant fields in the NAL | Description |
|---|---|---|
| SPS (7) | SPSID = 0 | SPS of stream 360p 30Hz |
| PPS (8) | PPSID = 0, SPSID= 0 | PPS of stream 360p 30Hz |
| Prefix (14) | PRID = 2, TID=0 | Prefix NAL of stream 360p 7.5Hz |
| IDR slice (5) | PPSID = 0, POC = 0 | Base layer IDR slice(s) in stream 360p 7.5Hz |
| Prefix (14) | PRID = 4, TID=2 | Prefix NAL of stream 360p 30Hz |
| Non-IDR slice (1) | PPSID = 0, POC = 1 | P slice(s) of stream 360p 30Hz |
| Prefix (14) | PRID = 3, TID=1 | Prefix NAL of stream 360p 15Hz |
| Non-IDR slice (1) | PPSID = 0, POC = 2 | P slice(s) of stream 360p 15Hz |
| Prefix (14) | PRID = 4, TID=2 | Prefix NAL of stream 360p 30Hz |
| Non-IDR slice (1) | PPSID = 0, POC = 3 | P slice(s) of stream 360p 30Hz |
| Prefix (14) | PRID = 2, TID=0 | Prefix NAL of stream 360p 7.5Hz |
| Non-IDR slice (1) | PPSID = 0, POC = 4 | P slice(s) of stream 360p 7.5Hz |
| ... | ... | ... |

Figure 14      1400

| NAL unit (type) | Relevant fields in the NAL | Description |
|---|---|---|
| SPS (7) | SPSID = 0 | SPS of stream 720p 30Hz |
| PPS (8) | PPSID = 0, SPSID= 0 | PPS of stream 720p 30Hz |
| Prefix (14) | PRID = 5, TID=0 | Prefix NAL of stream 720p 7.5Hz |
| IDR slice (5) | PPSID = 0, POC = 0 | Base layer IDR slice(s) in stream 720p 7.5Hz |
| Prefix (14) | PRID = 7, TID=2 | Prefix NAL of stream 720p 30Hz |
| Non-IDR slice (1) | PPSID = 0, POC = 1 | P slice(s) of stream 720p 30Hz |
| Prefix (14) | PRID = 6, TID=1 | Prefix NAL of stream 720p 15Hz |
| Non-IDR slice (1) | PPSID = 0, POC = 2 | P slice(s) of stream 720p 15Hz |
| Prefix (14) | PRID = 7, TID=2 | Prefix NAL of stream 720p 30Hz |
| Non-IDR slice (1) | PPSID = 0, POC = 3 | P slice(s) of stream 720p 30Hz |
| Prefix (14) | PRID = 5, TID=0 | Prefix NAL of stream 720p 7.5Hz |
| Non-IDR slice (1) | PPSID = 0, POC = 4 | P slice(s) of stream 720p 7.5Hz |
| ... | ... | ... |

Figure 15     1500

| NAL unit (type) | Relevant fields in the NAL | Description |
|---|---|---|
| SPS (7) | SPSID = 0 | SPS of stream 180p 15Hz |
| PPS (8) | PPSID = 0, SPSID= 0 | PPS of stream 180p 15Hz |
| SPS (7) | SPSID = 1 | SPS of stream 360p 30Hz |
| PPS (8) | PPSID = 1, SPSID = 1 | PPS of stream 360p 30Hz |
| SPS (7) | SPSID= 2 | SPS of stream 720p 30Hz |
| PPS (8) | PPSID = 2, SPSID = 2 | PPS of stream 720p 30Hz |
| Prefix (14) | PRID = 0, TID=0 | Prefix NAL of stream 180p 7.5Hz |
| IDR slice (5) | PPSID = 0, POC = 0 | Base layer IDR slice(s) in stream 180p 7.5Hz |
| Prefix (14) | PRID = 2, TID=0 | Prefix NAL of stream 360p 7.5Hz |
| IDR slice (5) | PPSID = 1, POC = 0 | Base layer IDR slice(s) in stream 360p 7.5Hz |
| Prefix (14) | PRID = 5, TID=0 | Prefix NAL of stream 720p 7.5Hz |
| IDR slice (5) | PPSID = 2, POC = 0 | Base layer IDR slice(s) in stream 720p 7.5Hz |
| Prefix (14) | PRID = 4, TID=2 | Prefix NAL of stream 360p 30Hz |
| Non-IDR slice (1) | PPSID = 1, POC = 1 | P slice(s) of stream 360p 30Hz |
| Prefix (14) | PRID = 7, TID=2 | Prefix NAL of stream 720p 30Hz |
| Non-IDR slice (1) | PPSID = 2, POC = 1 | P slice(s) of stream 720p 30Hz |
| Prefix (14) | PRID = 1, TID=1 | Prefix NAL of stream 180p 15Hz |
| Non-IDR slice (1) | PPSID = 0, POC = 2 | P slice(s) of stream 180p 15Hz |
| Prefix (14) | PRID = 3, TID=1 | Prefix NAL of stream 360p 15Hz |
| Non-IDR slice (1) | PPSID = 1, POC = 2 | P slice(s) of stream 360p 15Hz |
| Prefix (14) | PRID = 6, TID=1 | Prefix NAL of stream 720p 15Hz |
| Non-IDR slice (1) | PPSID = 2, POC = 2 | P slice(s) of stream 720p 15Hz |
| Prefix (14) | PRID = 4, TID=2 | Prefix NAL of stream 360p 30Hz |
| Non-IDR slice (1) | PPSID = 1, POC = 3 | P slice(s) of stream 360p 30Hz |
| Prefix (14) | PRID = 7, TID=2 | Prefix NAL of stream 720p 30Hz |
| Non-IDR slice (1) | PPSID = 2, POC = 3 | P slice(s) of stream 720p 30Hz |
| ... | ... | ... |

Figure 16    1600

| NAL unit (type) | Relevant fields in the NAL | Description |
|---|---|---|
| SPS (7) | SPSID = 0 | SPS of stream 180p 30Hz |
| PPS (8) | PPSID = 0, SPSID = 0 | PPS of stream 180p 30Hz |
| Prefix (14) | PRID = 0, TID=0, DID=0 | Prefix NAL of stream 180p 15Hz |
| IDR slice (5) | PPSID = 0, POC = 0 | Base layer IDR slice(s) in stream 180p 15Hz |
| Prefix (14) | PRID = 1, TID=1, DID=0 | Prefix NAL of stream 180p 30Hz |
| Non-IDR slice (1) | PPSID = 0, POC = 1 | P slice(s) of stream 180p 30Hz |
| Prefix (14) | PRID = 0, TID=0, DID=0 | Prefix NAL of stream 180p 15Hz |
| Non-IDR slice (1) | PPSID = 0, POC = 2 | Base layer P slice(s) in stream 180p 15Hz |
| Prefix (14) | PRID = 1, TID=1, DID=0 | Prefix NAL of stream 180p 30Hz |
| Non-IDR slice (1) | PPSID = 0, POC = 3 | P slice(s) of stream 180p 30Hz |
| ... | ... | ... |

Figure 17    1700

| NAL unit (type) | Relevant fields in the NAL | Description |
|---|---|---|
| SPS (7) | SPSID = 0 | SPS of stream 360p 30Hz |
| SSPS (15) | SPSID = 0 | Subset SPS of stream 360p 30Hz |
| PPS (8) | PPSID = 0, SPSID = 0 | PPS of stream 360p 30Hz SVC base layer |
| PPS (8) | PPSID = 1, SPSID = 0 | PPS of stream 360p 30Hz SVC scalable layer |
| Prefix (14) | PRID = 2, TID=0, DID=0 | Prefix NAL of stream 360p 15Hz |
| IDR slice (5) | PPSID = 0, POC = 0 | Base layer IDR slice(s) in stream 360p 15Hz |
| SVC ext slice (20) | PPSID = 1, PRID = 4, TID=0, DID=1 | EI slice(s) in stream 360p 15Hz |
| Prefix (14) | PRID = 3, TID=1, DID=0 | Prefix NAL of stream 360p 30Hz |
| Non-IDR slice (1) | PPSID = 0, POC = 1 | P slice(s) of stream 360p 30Hz |
| SVC ext slice (20) | PPSID = 1, PRID = 4, TID=1, DID=1 | EP slice(s) in stream 360p 30Hz |
| Prefix (14) | PRID = 2, TID=0, DID=0 | Prefix NAL of stream 360p 15H |
| Non-IDR slice (1) | PPSID = 0, POC = 2 | Base layer P slice(s) in stream 360p 15Hz |
| SVC ext slice (20) | PPSID = 1, PRID = 4, TID=0, DID=1 | EP slice(s) in stream 360p 15Hz |
| Prefix (14) | PRID = 3, TID=1, DID=0 | Prefix NAL of stream 360p 30Hz |
| Non-IDR slice (1) | PPSID = 0, POC = 3 | P slice(s) of stream 360p 30Hz |
| SVC ext slice (20) | PPSID = 1, PRID = 4, TID=1, DID=1 | EP slice(s) in stream 360p 30Hz |
| ... | ... | ... |

Figure 18     1800

| NAL unit (type) | Relevant fields in the NAL | Description |
|---|---|---|
| SPS (7) | SPSID = 0 | SPS of stream 720p 30Hz |
| SSPS (15) | SPSID = 0 | Subset SPS of stream 720p 30Hz |
| PPS (8) | PPSID = 0, SPSID = 0 | PPS of stream 720p 30Hz SVC base layer |
| PPS (8) | PPSID = 1, SPSID = 0 | PPS of stream 720p 30Hz SVC scalable layer |
| Prefix (14) | PRID = 5, TID=0, DID=0 | Prefix NAL of stream 720p 15Hz |
| IDR slice (5) | PPSID = 0, POC = 0 | Base layer IDR slice(s) in stream 720p 15Hz |
| SVC ext slice (20) | PPSID = 1, PRID = 7, TID=0, DID=1 | EI slice(s) in stream 720p 15Hz |
| Prefix (14) | PRID = 6, TID=1, DID = 0 | Prefix NAL of stream 720p 30Hz |
| Non-IDR slice (1) | PPSID = 0, POC = 1 | P slice(s) of stream 720p 30Hz |
| SVC ext slice (20) | PPSID = 1, PRID = 7, TID=1, DID=1 | EP slice(s) in stream 720p 30Hz |
| Prefix (14) | PRID = 5, TID=0, DID=0 | Prefix NAL of stream 720p 15Hz |
| Non-IDR slice (1) | PPSID = 0, POC = 2 | Base layer P slice(s) in stream 720p 15Hz |
| SVC ext slice (20) | PPSID = 1, PRID = 7, TID=0, DID=1 | EP slice(s) in stream 720p 15Hz |
| Prefix (14) | PRID = 6, TID=1, DID = 0 | Prefix NAL of stream 720p 30Hz |
| Non-IDR slice (1) | PPSID = 0, POC = 3 | P slice(s) of stream 720p 30Hz |
| SVC ext slice (20) | PPSID = 1, PRID = 7, TID=1, DID=1 | EP slice(s) in stream 720p 30Hz |
| ... | ... | ... |

Figure 19    1900

| NAL unit (type) | Relevant fields in the NAL | Description |
| --- | --- | --- |
| SPS (7) | SPSID = 0 | SPS of stream 180p 30Hz |
| PPS (8) | PPSID = 0, SPSID = 0 | PPS of stream 180p 30Hz |
| SPS (7) | SPSID = 1 | SPS of stream 360p 30Hz |
| SSPS (15) | SPSID = 0 | Subset SPS of stream 360p 30Hz |
| PPS (8) | PPSID = 1, SPSID = 1 | PPS of stream 360p 30Hz SVC base layer |
| PPS (8) | PPSID = 2, SPSID = 0 | PPS of stream 360p 30Hz SVC scalable layer |
| SPS (7) | SPSID = 2 | SPS of stream 720p 30Hz |
| SSPS (15) | SPSID = 1 | Subset SPS of stream 720p 30Hz |
| PPS (8) | PPSID = 3, SPSID = 2 | PPS of stream 720p 30Hz SVC base layer |
| PPS (8) | PPSID = 4, SPSID = 1 | PPS of stream 720p 30Hz SVC scalable layer |
| Prefix (14) | PRID = 0, TID=0, DID=0 | Prefix NAL of stream 180p 15Hz |
| IDR slice (5) | PPSID = 0, POC = 0 | Base layer IDR slice(s) in stream 180p 15Hz |
| Prefix (14) | PRID = 2, TID=0, DID=0 | Prefix NAL of stream 360p 15Hz |
| IDR slice (5) | PPSID = 1, POC = 0 | Base layer IDR slice(s) in stream 360p 15Hz |
| SVC ext slice (20) | PPSID = 2, PRID = 4, TID=0, DID=1 | EI slice(s) in stream 360p 15Hz |
| Prefix (14) | PRID = 5, TID=0, DID=0 | Prefix NAL of stream 720p 15Hz |
| IDR slice (5) | PPSID = 3, POC = 0 | Base layer IDR slice(s) in stream 720p 15Hz |
| SVC ext slice (20) | PPSID = 4, PRID = 7, TID=0, DID=1 | EI slice(s) in stream 720p 15Hz |
| Prefix (14) | PRID = 1, TID=1, DID=0 | Prefix NAL of stream 180p 30Hz |
| Non-IDR slice (1) | PPSID = 0, POC = 1 | P slice(s) of stream 180p 30Hz |
| Prefix (14) | PRID = 3, TID=1, DID=0 | Prefix NAL of stream 360p 30Hz |
| Non-IDR slice (1) | PPSID = 1, POC = 1 | P slice(s) of stream 360p 30Hz |
| SVC ext slice (20) | PPSID = 2, PRID = 4, TID=1, DID=1 | EP slice(s) in stream 360p 30Hz |
| Prefix (14) | PRID = 6, TID=1, DID = 0 | Prefix NAL of stream 720p 30Hz |
| Non-IDR slice (1) | PPSID = 3, POC = 1 | P slice(s) of stream 720p 30Hz |
| SVC ext slice (20) | PPSID = 4, PRID = 7, TID=1, DID=1 | EP slice(s) in stream 720p 30Hz |
| Prefix (14) | PRID = 0, TID=0, DID=0 | Prefix NAL of stream 180p 15Hz |
| Non-IDR slice (1) | PPSID = 0, POC = 2 | Base layer P slice(s) in stream 180p 15Hz |
| Prefix (14) | PRID = 2, TID=0, DID=0 | Prefix NAL of stream 360p 15H |
| Non-IDR slice (1) | PPSID = 1, POC = 2 | Base layer P slice(s) in stream 360p 15Hz |
| SVC ext slice (20) | PPSID = 2, PRID = 4, TID=0, DID=1 | EP slice(s) in stream 360p 15Hz |
| Prefix (14) | PRID = 5, TID=0, DID=0 | Prefix NAL of stream 720p 15Hz |
| Non-IDR slice (1) | PPSID = 3, POC = 2 | Base layer P slice(s) in stream 720p 15Hz |
| SVC ext slice (20) | PPSID = 4, PRID = 7, TID=0, DID=1 | EP slice(s) in stream 720p 15Hz |
| ... | ... | ... |

Figure 20    2000

| NAL unit (type) | Relevant fields in the NAL | Description |
|---|---|---|
| SPS (7) | SPSID = 0 | SPS of stream 180p 30Hz |
| PPS (8) | PPSID = 0, SPSID = 0 | PPS of stream 180p 30Hz |
| Prefix (14) | PRID = 0, TID=0, DID=0 | Prefix NAL of stream 180p 15Hz |
| IDR slice (5) | PPSID = 0, POC = 0 | Base layer IDR slice(s) in stream 180p 15Hz |
| Prefix (14) | PRID = 1, TID=1, DID=0 | Prefix NAL of stream 180p 30Hz |
| Non-IDR slice (1) | PPSID = 0, POC = 1 | P slice(s) of stream 180p 30Hz |
| Prefix (14) | PRID = 0, TID=0, DID=0 | Prefix NAL of stream 180p 15Hz |
| Non-IDR slice (1) | PPSID = 0, POC = 2 | Base layer P slice(s) in stream 180p 15Hz |
| Prefix (14) | PRID = 1, TID=1, DID=0 | Prefix NAL of stream 180p 30Hz |
| Non-IDR slice (1) | PPSID = 0, POC = 3 | P slice(s) of stream 180p 30Hz |
| ... | ... | ... |

Figure 21    2100

| NAL unit (type) | Relevant fields in the NAL | Description |
|---|---|---|
| SPS (7) | SPSID = 0 | SPS of stream 240p 30Hz |
| SSPS (15) | SPSID = 0 | Subset SPS of stream 360p 30Hz |
| PPS (8) | PPSID = 0, SPSID = 0 | PPS of stream 240p 30Hz SVC base layer |
| PPS (8) | PPSID = 1, SPSID = 0 | PPS of stream 360p 30Hz SVC scalable layer |
| Prefix (14) | PRID = 2, TID=0, DID=0 | Prefix NAL of stream 240p 15Hz |
| IDR slice (5) | PPSID = 0, POC = 0 | Base layer IDR slice(s) in stream 240p 15Hz |
| SVC ext slice (20) | PPSID = 1, PRID = 4, TID=0, DID=1 | EI slice(s) in stream 360p 15Hz |
| Prefix (14) | PRID = 3, TID=1, DID=0 | Prefix NAL of stream 240p 30Hz |
| Non-IDR slice (1) | PPSID = 0, POC = 1 | P slice(s) of stream 240p 30Hz |
| SVC ext slice (20) | PPSID = 1, PRID = 4, TID=1, DID=1 | EP slice(s) in stream 360p 30Hz |
| Prefix (14) | PRID = 2, TID=0, DID=0 | Prefix NAL of stream 240p 15H |
| Non-IDR slice (1) | PPSID = 0, POC = 2 | Base layer P slice(s) in stream 240p 15Hz |
| SVC ext slice (20) | PPSID = 1, PRID = 4, TID=0, DID=1 | EP slice(s) in stream 360p 15Hz |
| Prefix (14) | PRID = 3, TID=1, DID=0 | Prefix NAL of stream 240p 30Hz |
| Non-IDR slice (1) | PPSID = 0, POC = 3 | P slice(s) of stream 240p 30Hz |
| SVC ext slice (20) | PPSID = 1, PRID = 4, TID=1, DID=1 | EP slice(s) in stream 360p 30Hz |
| ... | ... | ... |

Figure 22      2200

| NAL unit (type) | Relevant fields in the NAL | Description |
|---|---|---|
| SPS (7) | SPSID = 0 | SPS of stream 480p 30Hz |
| SSPS (15) | SPSID = 0 | Subset SPS of stream 720p 30Hz |
| PPS (8) | PPSID = 0, SPSID = 0 | PPS of stream 480p 30Hz SVC base layer |
| PPS (8) | PPSID = 1, SPSID = 0 | PPS of stream 720p 30Hz SVC scalable layer |
| Prefix (14) | PRID = 5, TID=0, DID=0 | Prefix NAL of stream 480p 15Hz |
| IDR slice (5) | PPSID = 0, POC = 0 | Base layer IDR slice(s) in stream 480p 15Hz |
| SVC ext slice (20) | PPSID = 1, PRID = 7, TID=0, DID=1 | EI slice(s) in stream 720p 15Hz |
| Prefix (14) | PRID = 6, TID=1, DID = 0 | Prefix NAL of stream 480p 30Hz |
| Non-IDR slice (1) | PPSID = 0, POC = 1 | P slice(s) of stream 480p 30Hz |
| SVC ext slice (20) | PPSID = 1, PRID = 7, TID=1, DID=1 | EP slice(s) in stream 720p 30Hz |
| Prefix (14) | PRID = 5, TID=0, DID=0 | Prefix NAL of stream 480p 15Hz |
| Non-IDR slice (1) | PPSID = 0, POC = 2 | Base layer P slice(s) in stream 480p 15Hz |
| SVC ext slice (20) | PPSID = 1, PRID = 7, TID=0, DID=1 | EP slice(s) in stream 720p 15Hz |
| Prefix (14) | PRID = 6, TID=1, DID = 0 | Prefix NAL of stream 480p 30Hz |
| Non-IDR slice (1) | PPSID = 0, POC = 3 | P slice(s) of stream 480p 30Hz |
| SVC ext slice (20) | PPSID = 1, PRID = 7, TID=1, DID=1 | EP slice(s) in stream 720p 30Hz |
| ... | ... | ... |

Figure 23  2300

| NAL unit (type) | Relevant fields in the NAL | Description |
| --- | --- | --- |
| SPS (7) | SPSID = 0 | SPS of stream 180p 30Hz |
| PPS (8) | PPSID = 0, SPSID = 0 | PPS of stream 180p 30Hz |
| SPS (7) | SPSID = 1 | SPS of stream 240p 30Hz |
| SSPS (15) | SPSID = 0 | Subset SPS of stream 360p 30Hz |
| PPS (8) | PPSID = 1, SPSID = 1 | PPS of stream 240p 30Hz SVC base layer |
| PPS (8) | PPSID = 2, SPSID = 0 | PPS of stream 360p 30Hz SVC scalable layer |
| SPS (7) | SPSID = 2 | SPS of stream 480p 30Hz |
| SSPS (15) | SPSID = 1 | Subset SPS of stream 720p 30Hz |
| PPS (8) | PPSID = 3, SPSID = 2 | PPS of stream 480p 30Hz SVC base layer |
| PPS (8) | PPSID = 4, SPSID = 1 | PPS of stream 720p 30Hz SVC scalable layer |
| Prefix (14) | PRID = 0, TID=0, DID=0 | Prefix NAL of stream 180p 15Hz |
| IDR slice (5) | PPSID = 0, POC = 0 | Base layer IDR slice(s) in stream 180p 15Hz |
| Prefix (14) | PRID = 2, TID=0, DID=0 | Prefix NAL of stream 240p 15Hz |
| IDR slice (5) | PPSID = 1, POC = 0 | Base layer IDR slice(s) in stream 240p 15Hz |
| SVC ext slice (20) | PPSID = 2, PRID = 4, TID=0, DID=1 | EI slice(s) in stream 360p 15Hz |
| Prefix (14) | PRID = 5, TID=0, DID=0 | Prefix NAL of stream 480p 15Hz |
| IDR slice (5) | PPSID = 3, POC = 0 | Base layer IDR slice(s) in stream 480p 15Hz |
| SVC ext slice (20) | PPSID = 4, PRID = 7, TID=0, DID=1 | EI slice(s) in stream 720p 15Hz |
| Prefix (14) | PRID = 1, TID=1, DID=0 | Prefix NAL of stream 180p 30Hz |
| Non-IDR slice (1) | PPSID = 0, POC = 1 | P slice(s) of stream 180p 30Hz |
| Prefix (14) | PRID = 3, TID=1, DID=0 | Prefix NAL of stream 240p 30Hz |
| Non-IDR slice (1) | PPSID = 1, POC = 1 | P slice(s) of stream 240p 30Hz |
| SVC ext slice (20) | PPSID = 2, PRID = 4, TID=1, DID=1 | EP slice(s) in stream 360p 30Hz |
| Prefix (14) | PRID = 6, TID=1, DID = 0 | Prefix NAL of stream 480p 30Hz |
| Non-IDR slice (1) | PPSID = 3, POC = 1 | P slice(s) of stream 480p 30Hz |
| SVC ext slice (20) | PPSID = 4, PRID = 7, TID=1, DID=1 | EP slice(s) in stream 720p 30Hz |
| Prefix (14) | PRID = 0, TID=0, DID=0 | Prefix NAL of stream 180p 15Hz |
| Non-IDR slice (1) | PPSID = 0, POC = 2 | Base layer P slice(s) in stream 180p 15Hz |
| Prefix (14) | PRID = 2, TID=0, DID=0 | Prefix NAL of stream 240p 15H |
| Non-IDR slice (1) | PPSID = 1, POC = 2 | Base layer P slice(s) in stream 240p 15Hz |
| SVC ext slice (20) | PPSID = 2, PRID = 4, TID=0, DID=1 | EP slice(s) in stream 360p 15Hz |
| Prefix (14) | PRID = 5, TID=0, DID=0 | Prefix NAL of stream 480p 15Hz |
| Non-IDR slice (1) | PPSID = 3, POC = 2 | Base layer P slice(s) in stream 480p 15Hz |
| SVC ext slice (20) | PPSID = 4, PRID = 7, TID=0, DID=1 | EP slice(s) in stream 720p 15Hz |
| ... | ... | ... |

Figure 24   2400

| NAL unit (type) | Relevant fields in the NAL | Description |
|---|---|---|
| SPS (7) | SPSID = 0 | SPS of stream 180p 30Hz |
| SSPS (15) | SSPID = 0 | Subset SPS of stream 360p 30Hz |
| PPS (8) | PPSID = 0, SPSID = 0 | PPS of stream 180p 30Hz SVC base layer |
| PPS (8) | PPSID = 1, SPSID = 0 | PPS of stream 360p 30Hz SVC scalable layer |
| Prefix (14) | PRID = 0, TID=0, DID=0 | Prefix NAL of stream 180p 15Hz |
| IDR slice (5) | PPSID = 0, POC = 0 | Base layer IDR slice(s) in stream 180p 15Hz |
| SVC ext slice (20) | PPSID = 1, PRID = 2, TID=0, DID=1 | EI slice(s) in stream 360p 15Hz |
| Prefix (14) | PRID = 1, TID=1, DID=0 | Prefix NAL of stream 180p 30Hz |
| Non-IDR slice (1) | PPSID = 0, POC = 1 | P slice(s) of stream 180p 30Hz |
| SVC ext slice (20) | PPSID = 1, PRID = 2, TID=1, DID=1 | EP slice(s) in stream 360p 30Hz |
| Prefix (14) | PRID = 0, TID=0, DID=0 | Prefix NAL of stream 180p 15Hz |
| Non-IDR slice (1) | PPSID = 0, POC = 2 | P slice(s) in stream 180p 15Hz |
| SVC ext slice (20) | PPSID = 1, PRID = 2, TID=0, DID=1 | EP slice(s) in stream 360p 15Hz |
| Prefix (14) | PRID = 1, TID=1, DID=0 | Prefix NAL of stream 180p 30Hz |
| Non-IDR slice (1) | PPSID = 0, POC = 3 | P slice(s) of stream 180p 30Hz |
| SVC ext slice (20) | PPSID = 1, PRID = 2, TID=1, DID=1 | EP slice(s) in stream 360p 30Hz |
| ... | ... | ... |

Figure 25        2500

| NAL unit (type) | Relevant fields in the NAL | Description |
|---|---|---|
| SPS (7) | SPSID = 0 | SPS of stream 480p 30Hz |
| SSPS (15) | SSPID = 0 | Subset SPS of stream 480p 30Hz |
| SSPS (15) | SSPID = 1 | Subset SPS of stream 720p 30Hz |
| PPS (8) | PPSID = 0, SPSID = 0 | PPS of stream 480p 30Hz SVC base layer |
| PPS (8) | PPSID = 1, SPSID = 0 | PPS of stream 480p 30Hz SVC scalable layer |
| PPS (8) | PPSID = 2, SPSID = 1 | PPS of stream 720p 30Hz SVC scalable layer |
| Prefix (14) | PRID = 3, TID=0, DID=0 | Prefix NAL of stream 480p 15Hz |
| IDR slice (5) | PPSID = 0, POC = 0 | Base layer IDR slice(s) in stream 480p 15Hz |
| SVC ext slice (20) | PPSID = 1, PRID = 5, TID=0, DID=1 | EI slice(s) in stream 480p 15Hz |
| SVC ext slice (20) | PPSID = 2, PRID = 6, TID=0, DID=2 | EI slice(s) in stream 720p 15Hz |
| SVC ext slice (20) | PPSID = 2, PRID = 7, TID=0, DID=3 | EI slice(s) in stream 720p 15Hz |
| Prefix (14) | PRID = 4, TID=1, DID=0 | Prefix NAL of stream 480p 30Hz |
| Non-IDR slice (1) | PPSID = 0, POC = 1 | P slice(s) of stream 480p 30Hz |
| SVC ext slice (20) | PPSID = 1, PRID = 5, TID=1, DID=1 | EP slice(s) in stream 480p 30Hz |
| SVC ext slice (20) | PPSID = 2, PRID = 6, TID=1, DID=2 | EP slice(s) in stream 720p 30Hz |
| SVC ext slice (20) | PPSID = 2, PRID = 7, TID=1, DID=3 | EP slice(s) in stream 720p 30Hz |
| Prefix (14) | PRID = 3, TID=0, DID=0 | Prefix NAL of stream 480p 15Hz |
| Non-IDR slice (1) | PPSID = 0, POC = 2 | P slice(s) in stream 480p 15Hz |
| SVC ext slice (20) | PPSID = 1, PRID = 5, TID=0, DID=1 | EP slice(s) in stream 480p 15Hz |
| SVC ext slice (20) | PPSID = 2, PRID = 6, TID=0, DID=2 | EP slice(s) in stream 720p 15Hz |
| SVC ext slice (20) | PPSID = 2, PRID = 7, TID=0, DID=3 | EP slice(s) in stream 720p 15Hz |
| Prefix (14) | PRID = 4, TID=1, DID=0 | Prefix NAL of stream 480p 30Hz |
| Non-IDR slice (1) | PPSID = 0, POC = 3 | P slice(s) of stream 480p 30Hz |
| SVC ext slice (20) | PPSID = 1, PRID = 5, TID=1, DID=1 | EP slice(s) in stream 480p 30Hz |
| SVC ext slice (20) | PPSID = 2, PRID = 6, TID=1, DID=2 | EP slice(s) in stream 720p 30Hz |
| SVC ext slice (20) | PPSID = 2, PRID = 7, TID=1, DID=3 | EP slice(s) in stream 720p 30Hz |
| ... | ... | ... |

Figure 26    2600

| NAL unit (type) | Relevant fields in the NAL | Description |
|---|---|---|
| SPS (7) | SPSID = 0 | SPS of stream 180p 30Hz |
| SSPS (15) | SSPID = 0 | Subset SPS of stream 360p 30Hz |
| PPS (8) | PPSID = 0, SPSID = 0 | PPS of stream 180p 30Hz SVC base layer |
| PPS (8) | PPSID = 1, SPSID = 0 | PPS of stream 360p 30Hz SVC scalable layer |
| SPS (7) | SPSID = 1 | SPS of stream 480p 30Hz |
| SSPS (15) | SSPID = 1 | Subset SPS of stream 480p 30Hz |
| SSPS (15) | SSPID = 2 | Subset SPS of stream 720p 30Hz |
| PPS (8) | PPSID = 2, SPSID = 1 | PPS of stream 480p 30Hz SVC base layer |
| PPS (8) | PPSID = 3, SPSID = 1 | PPS of stream 480p 30Hz SVC scalable layer |
| PPS (8) | PPSID = 4, SPSID = 2 | PPS of stream 720p 30Hz SVC scalable layer |
| Prefix (14) | PRID = 0, TID=0, DID=0 | Prefix NAL of stream 180p 15Hz |
| IDR slice (5) | PPSID = 0, POC = 0 | Base layer IDR slice(s) in stream 180p 15Hz |
| SVC ext slice (20) | PPSID = 1, PRID = 2, TID=0, DID=1 | EI slice(s) in stream 360p 15Hz |
| Prefix (14) | PRID = 3, TID=0, DID=0 | Prefix NAL of stream 480p 15Hz |
| IDR slice (5) | PPSID = 2, POC = 0 | Base layer IDR slice(s) in stream 480p 15Hz |
| SVC ext slice (20) | PPSID = 3, PRID = 5, TID=0, DID=1 | EI slice(s) in stream 480p 15Hz |
| SVC ext slice (20) | PPSID = 4, PRID = 6, TID=0, DID=2 | EI slice(s) in stream 720p 15Hz |
| SVC ext slice (20) | PPSID = 4, PRID = 7, TID=0, DID=3 | EI slice(s) in stream 720p 15Hz |
| Prefix (14) | PRID = 1, TID=1, DID=0 | Prefix NAL of stream 180p 30Hz |
| Non-IDR slice (1) | PPSID = 0, POC = 1 | P slice(s) of stream 180p 30Hz |
| SVC ext slice (20) | PPSID = 1, PRID = 2, TID=1, DID=1 | EP slice(s) in stream 360p 30Hz |
| Prefix (14) | PRID = 4, TID=1, DID=0 | Prefix NAL of stream 480p 30Hz |
| Non-IDR slice (1) | PPSID = 2, POC = 1 | P slice(s) of stream 480p 30Hz |
| SVC ext slice (20) | PPSID = 3, PRID = 5, TID=1, DID=1 | EP slice(s) in stream 480p 30Hz |
| SVC ext slice (20) | PPSID = 4, PRID = 6, TID=1, DID=2 | EP slice(s) in stream 720p 30Hz |
| SVC ext slice (20) | PPSID = 4, PRID = 7, TID=1, DID=3 | EP slice(s) in stream 720p 30Hz |
| Prefix (14) | PRID = 0, TID=0, DID=0 | Prefix NAL of stream 180p 15Hz |
| Non-IDR slice (1) | PPSID = 0, POC = 2 | P slice(s) in stream 180p 15Hz |
| SVC ext slice (20) | PPSID = 1, PRID = 2, TID=0, DID=1 | EP slice(s) in stream 360p 15Hz |
| Prefix (14) | PRID = 3, TID=0, DID=0 | Prefix NAL of stream 480p 15Hz |
| Non-IDR slice (1) | PPSID = 2, POC = 2 | P slice(s) in stream 480p 15Hz |
| SVC ext slice (20) | PPSID = 3, PRID = 5, TID=0, DID=1 | EP slice(s) in stream 480p 15Hz |
| SVC ext slice (20) | PPSID = 4, PRID = 6, TID=0, DID=2 | EP slice(s) in stream 720p 15Hz |
| SVC ext slice (20) | PPSID = 4, PRID = 7, TID=0, DID=3 | EP slice(s) in stream 720p 15Hz |
| ... | ... | ... |

MULTI-LAYER ENCODING AND DECODING

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices.

Digital video can consume an extremely high amount of bits. Engineers use compression (also called source coding or source encoding) to reduce the bitrate of digital video. Compression decreases the cost of storing and transmitting video information by converting the information into a lower bitrate form. Decompression (also called decoding) reconstructs a version of the original information from the compressed form. A "codec" is an encoder/decoder system.

Over the last two decades, various video codec standards have been adopted, including the H.261, H.262 (MPEG-2 or ISO/IEC 13818-2), H.263 and H.264 (AVC or ISO/IEC 14496-10) standards and the MPEG-1 (ISO/IEC 11172-2), MPEG-4 Visual (ISO/IEC 14496-2) and SMPTE 421M standards. In particular, decoding according to the H.264 standard is widely used in game consoles and media players to play back encoded video. H.264 decoding is also widely used in set-top boxes, personal computers, smart phones and other mobile computing devices for playback of encoded video streamed over the Internet or other networks. A video codec standard typically defines options for the syntax of an encoded video bitstream, detailing parameters in the bitstream when particular features are used in encoding and decoding. In many cases, a video codec standard also provides details about the decoding operations a decoder should perform to achieve correct results in decoding.

Several factors affect quality of video information, including spatial resolution, frame rate and distortion. Spatial resolution generally refers to the number of samples in a video image. Images with higher spatial resolution tend to look crisper than other images and contain more discernable details. Frame rate is a common term for temporal resolution for video. Video with higher frame rate tends to mimic the smooth motion of natural objects better than other video, and can similarly be considered to contain more detail in the temporal dimension. During encoding, an encoder can selectively introduce distortion to reduce bitrate, usually by quantizing video information during encoding. If an encoder introduces little distortion, the encoder maintains quality at the cost of higher bitrate. An encoder can introduce more distortion to reduce bitrate, but quality typically suffers. For these factors, the tradeoff for high quality is the cost of storing and transmitting the information in terms of bitrate.

When encoded video is delivered over the Internet to set-top boxes, mobile computing devices or personal computers, one video source can provide encoded video to multiple receiver devices. Or, in a videoconference, one device may deliver encoded video to multiple receiver devices. Different receiver devices may have different screen sizes or computational capabilities, with some devices able to decode and play back high quality video, and other devices only able to play back lower quality video. Also, different receiver devices may use network connections having different bandwidths, with some devices able to receive higher bitrate (higher quality) encoded video, and other devices only able to receive lower bitrate (lower quality) encoded video.

In such scenarios, with simulcast encoding and delivery, video is encoded in multiple different ways to provide versions of the video at different levels of distortion, temporal quality and/or spatial resolution quality. Each version of video is represented in a bitstream that can be decoded to reconstruct that version of the video, independent of decoding other versions of the video. A video source (or given receiver device) can select an appropriate version of video for delivery to the receiver device, considering available network bandwidth, screen size, computational capabilities, or another characteristic of the receiver device.

Scalable video coding (SVC) and decoding are another way to provide different versions of video at different levels of distortion, temporal quality and/or spatial resolution quality. With SVC, an encoder splits video into a base layer and one or more enhancement layers. The base layer alone provides a reconstruction of the video at a lower quality level (e.g., lower frame rate, lower spatial resolution and/or higher distortion). One or more enhancement layers can be reconstructed and added to reconstructed base layer video to increase video quality in terms of higher frame rate, higher spatial resolution and/or lower distortion. Scalability in terms of distortion is sometimes called SNR scalability.

In some respects, SVC outperforms simulcast transmission because SVC exploits redundancy between different versions of the video. Usually, for a given level of quality, the combined bitrate of the base layer and enhancement layer(s) is slightly higher than the bitrate of an independently decodable simulcast version of the video. The bitrate of an enhancement layer by itself, however, is lower than the bitrate of the independently decodable version of the video. For all of the levels of quality, the collective bitrate of the base layer and enhancement layers is much lower than the collective bitrate of the different simulcast versions of the video. For this reason, SVC reduces uplink bandwidth utilization when video is uploaded from an encoder site to a delivery server on a network.

The performance of SVC can be limited in other respects, however. First, many hardware encoders do not support SVC that is fully scalable across all aspects of quality. For example, many web cameras can encode H.264 video with at most two temporal layers, which limits possible operational points for quality layers. Second, in extreme cases, when quality differs too much between two successive SNR layers, the efficiency of SVC can be worse than simply splitting the video into two simulcast streams for the two levels of SNR quality, respectively. Third, if downstream network bandwidth is a bottleneck between a delivery server and receiver devices, simulcast may be preferable since SVC video uses more bits that simulcast video for a given level of quality. Fourth, some SVC bitstreams require that temporal prediction structure be the same across spatial quality layers and SNR quality layers, which can limit the flexibility of SVC. Finally, providing spatial scalability in an SVC bitstream can increase computational requirements, memory usage and encoding latency. When spatial quality layers for a higher resolution depend on spatial quality layers at a lower resolution, the spatial layers at the lower resolution are typically generated, encoded, reconstructed and buffered for use in predicting the higher resolution layers, which adds delay and frame memory. These costs of spatial scalability have hindered its adoption in hardware encoders and decoders.

SUMMARY

In summary, innovations described herein provide a generic encoding and decoding framework that includes some features of simulcast video and some features of SVC video. The generic framework draws on advantages of SVC and advantages of simulcast to provide flexible and efficient coding and decoding of video in various scenarios.

According to a first set of innovations described herein, a bitstream multiplexer (MUX) multiplexes component bitstreams into a multi-layer encoding (MLE) bitstream, then outputs the MLE bitstream. Each of the component bitstreams provides an alternative version of input video. A component bitstream can be a non-scalable bitstream. Or, a component bitstream can be a scalable bitstream that includes base layer and at least one enhancement layer. For example, the base layer represents a first temporal resolution of the input video and the enhancement layer represents a second temporal resolution higher than the first temporal resolution. Or, the base layer represents a first SNR level of the input video and the enhancement layer represents a second SNR level higher than the first SNR level. Or, the base layer represents a first spatial resolution of the input video and the enhancement layer represents a second spatial resolution higher than the first spatial resolution. Or, when the alternative versions of the video are alternative simulcast versions of the video, the component bitstreams can collectively provide multiple spatial resolution options between the component bitstreams.

More generally, the multiple component bitstreams can differ from one another in terms of any of (1) the number of layers of temporal, spatial and/or signal to noise ratio (SNR) scalability, if any, supported in that component bitstream, format of decoding of the component bitstream, or profile and/or level for decoding of the component bitstream. For example, an MLE bitstream can include component bitstreams in different formats. Or, an MLE bitstream can include component bitstreams for different profiles/levels of decoding within a given format to serve decoders with different capabilities.

The MUX can be part of a computing system that also includes one or more video encoders. In this case, the video encoder(s) encode the input video to produce the component bitstreams of encoded video data. During the encoding, the encoder(s) can set values of at least some parameter set identifiers in the component bitstreams to avoid conflicting uses of the values in the MLE bitstream. For example, the encoder(s) set the values of picture parameter set (PPS) identifiers and sequence parameter set (SPS) identifiers to avoid conflicting uses of the values.

Or, the MUX can be part of a different computing system than such video encoder(s). In this case, the MUX can receive the component bitstreams and rewrite values of parameter set identifiers to avoid conflicting uses of the values in the MLE bitstream. For example, for a given value of a parameter set identifier, the MUX identifies a set of candidate values appropriate for the given value based on number of bits in the given value. The set of candidate values can include candidate values having that number of bits as well as candidate values having one or more bytes plus that number of bits. The MUX selects a new value from the set of candidate values and replaces the given value with the new value. In this way, the MUX can perform the rewriting without bit shifting operations.

During the multiplexing, the MUX can insert marker data units in the MLE bitstream. Each of the marker data units includes a priority identifier (PRID) and one or more quality layer identifiers. A PRID associates a video data unit with a given layer of one of the component bitstreams.

With the multiplexing, the MUX can enforce composition rules. For example, according to a first composition rule, PRIDs identify layers of the component bitstreams. The PRIDs can be included in marker data units for at least some slice data units but directly included as part of other slice data units. According to a second composition rule, each of the component bitstreams is assigned a non-overlapping range of the PRIDs, within which a base layer for the component bitstream has the lowest PRID in the range. According to a third composition rule, PPS identifiers (PPSIDs) are unique across the component bitstreams, and according to a fourth composition rule, SPS identifiers (SPSIDs) are unique across the component bitstreams.

According to a second set of innovations described herein, a bitstream demultiplexer (DEMUX) receives an MLE bitstream that includes multiple component bitstreams. Each of the component bitstreams provides an alternative version of input video. The DEMUX demultiplexes at least part of at least one of the component bitstreams from the MLE bitstream, and outputs the demultiplexed content. A component bitstream can be a non-scalable bitstream, or a component bitstream can be a scalable bitstream that includes a base layer and at least one enhancement layer. The DEMUX can be part of a computing system for a multipoint conferencing unit, network server, receiver or other type of system.

During the demultiplexing, the DEMUX can receive and parse marker data units in the MLE bitstream, where each of the marker data units includes a PRID and one or more quality layer identifiers. A PRID associates a video data unit with a given layer of one of the component bitstreams.

The demultiplexing can follow decomposition rules. For example, according to a first decomposition rule, a base layer for each of the component bitstreams has a PRID and one or more zero-value quality layer identifiers. According to a second decomposition rule, a given non-base layer of any one of the component bitstreams has a PRID that, relative to the PRIDs of the base layers, indicates one of the component bitstreams for the given non-base layer. According to a third decomposition rule, PPSIDs in slice data units identify corresponding PPS data units and, according to a fourth decomposition rule, SPSIDs in the corresponding PPS data units identify corresponding SPS data units.

According to a third set of innovations described herein, a bitstream rewriting tool receives one or more bitstreams and rewrites values of at least one syntax element in the bitstream(s). The bitstream rewriting tool can be part of a bitstream MUX or other tool. As part of the rewriting, for a given value, the bitstream rewriting tool identifies a set of candidate values appropriate for the given value based on number of bits in the given value. For example, the syntax element is a PPSID whose values are variable length coded in the bitstream(s). The set of candidate values can include candidate values having the number of bits in the given value as well as candidate values having one or more bytes plus that number of bits. The bitstream rewriting tool selects a new value from the set of candidate values and replaces the given value with the new value. In this way, the bitstream rewriting tool can perform the rewriting without bit shifting operations.

The foregoing and other objects, features, and advantages of the invention will become more apparent from the following detailed description, which proceeds with reference to the accompanying figures.

BRIEF DESCRIPTION OF THE DRAWINGS

FIGS. 8-26 are diagrams illustrating values of syntax elements in example MLE bitstreams.

DETAILED DESCRIPTION

Innovations for multi-layer encoding (MLE) and decoding are described herein. A bitstream multiplexer (MUX) interleaves one or more component bitstreams together to produce an MLE bitstream, where each of the component bitstreams can itself be a scalable bitstream or non-scalable bitstream. In example implementations, the MLE bitstream is an elementary bitstream that follows the syntax of a standard or format, and each of the component bitstreams is an elementary bitstream that follows the syntax of a standard or format. In this way, the MLE bitstream can be packetized as a series of data units including or derived from the data units of the component bitstreams. A corresponding bitstream demultiplexer (DEMUX) de-interleaves at least part of the component bitstream(s) from the MLE stream.

In addition to innovative ways of multiplexing component bitstreams into a single MLE bitstream, techniques and tools are described herein for rewriting values of syntax elements to avoid conflicting assignments of the values across the component bitstreams. For example, values of PPSID can be rewritten in the component bitstreams in a way that avoids bit shifting of data units.

In some examples described herein, the MLE bitstream and component bitstreams comply with the H.264 standard, which describes syntax and semantics of scalable bitstreams (in Annex G of the standard) and non-scalable bitstreams (in AVC sections of the standard). In H.264 bitstreams, the data units are network abstraction layer (NAL) units, and syntax elements such as PRIDs, quality layer identifiers such as temporal identifier (TID), dependency identifier (DID) and/or quality identifier (QID), picture parameter set (PPS) identifiers and sequence parameter set (SPS) identifiers comport with H.264 syntax and semantics. In this way, MLE bitstreams can be used with existing storage and transport channels that are adapted for H.264 video. Innovations described herein can also be implemented for encoding and decoding according to other standards or formats. For example, innovations described herein can be used to provide multi-layer encoding and decoding for VP6, VP8, SMPTE 421M or another format, including formats under development such as H.265 or HEVC, or a mixture of component bitstreams with different formats.

More generally, various alternatives to the examples described herein are possible. Certain techniques described with reference to flowchart diagrams can be altered by changing the ordering of stages shown in the flowcharts, by splitting, repeating or omitting certain stages, etc. The various aspects of multi-layer encoding and decoding can be used in combination or separately. Different embodiments use one or more of the described innovations. Some of the techniques and tools described herein address one or more of the problems noted in the background. Typically, a given technique/tool does not solve all such problems.

I. Example Computing Systems

Figure 1:
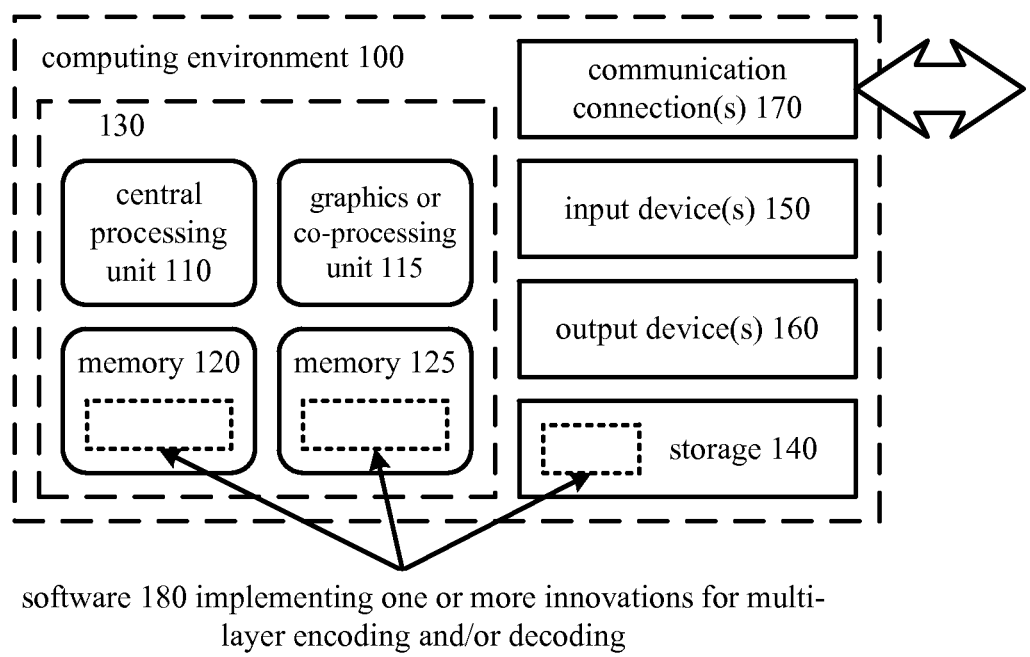
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for multi-layer encoding and/or decoding, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing system (100). The storage (140) stores instructions for the software (180) implementing one or more innovations for multi-layer encoding and/or decoding.

The input device(s) (150) may be a touch input device such as a keyboard, mouse, pen, or trackball, a voice input device, a scanning device, or another device that provides input to the computing system (100). For video encoding, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Frameworks for Multi-layer Encoding and Decoding

Figure 2A:
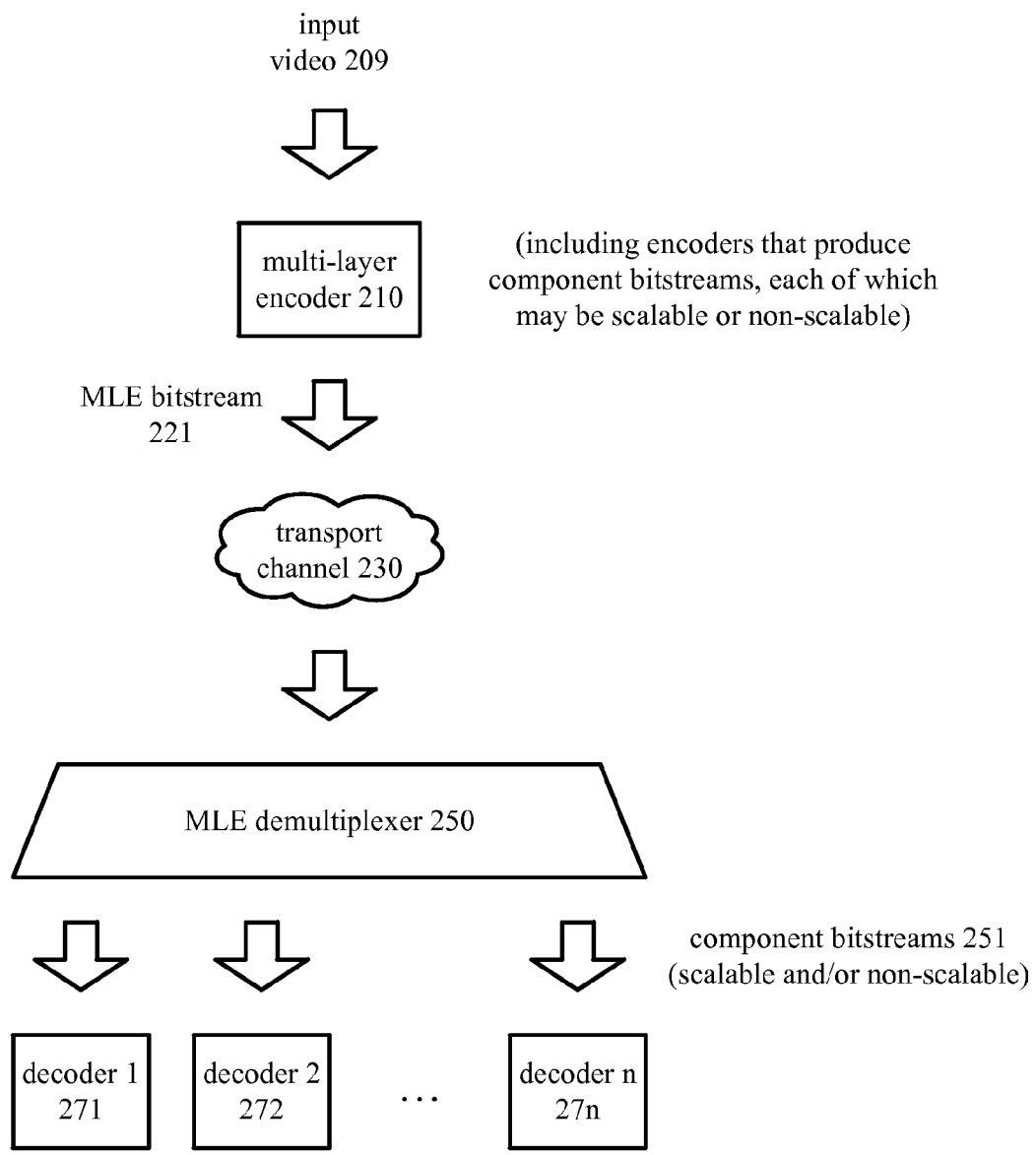
FIGS. 2a and 2b are diagrams of generic frameworks for multi-layer encoding (MLE) and decoding in conjunction with which some described embodiments can be implemented.
Figure 2B:
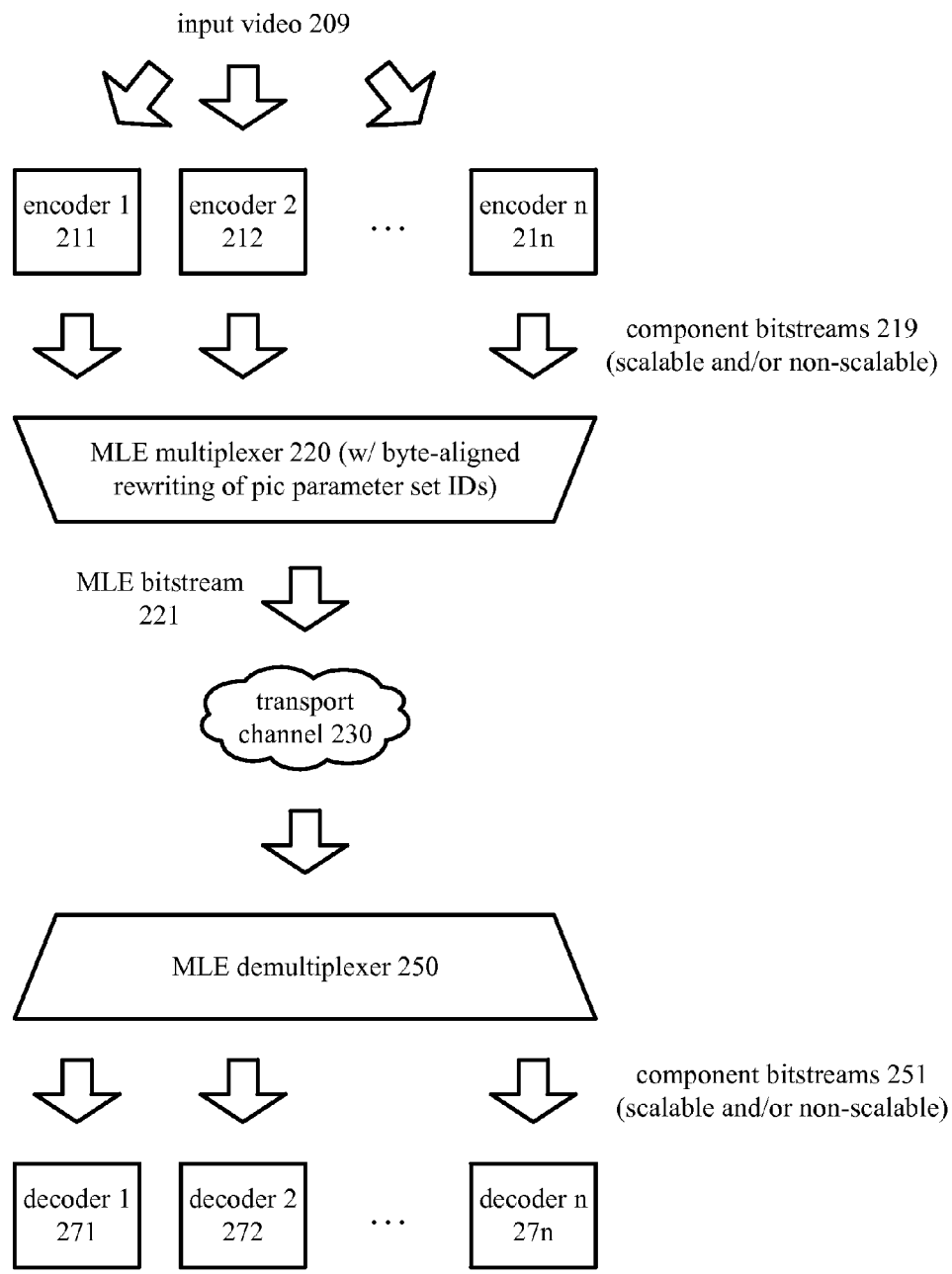

FIGS. 2a and 2b show example MLE frameworks (201, 202) that include video encoders and MLE multiplexers as well as MLE demultiplexers and video decoders. The MLE frameworks (201, 202) support multiplexing/demultiplexing of multiple non-scalable bitstreams, multiple scalable bitstreams or a mix of scalable and non-scalable bitstreams.

In the framework (201) shown in FIG. 2a, the multi-layer encoder (210) includes one or more video encoders as well as a bitstream MUX. Each encoder produces a component bitstream of encoded data compliant with the H.264 standard (also known as ISO-IEC 14496-10), SMPTE 421M standard, H.265/HEVC standard, another standard, or a proprietary format. The output bitstream from an encoder can be a non-scalable bitstream or scalable bitstream, which may provide for spatial, temporal and/or SNR scalability within the scalable bitstream.

For example, in the context of the H.264 standard, a scalable bitstream complies with the SVC section of the H.264 standard (Annex G). The SVC bitstream itself includes a non-scalable stream (sometimes called an AVC stream) for the base layer of the SVC bitstream. The base layer is marked with certain values for syntax elements—for example, base layer data units have temporal identifiers of zero and dependency identifiers of zero for the base layer for temporal scalability and SNR scalability. An AVC bitstream can support temporal scalability with little or no modification, if certain patterns of picture coding and reference picture usage are followed. In some cases, an SVC bitstream further supports spatial resolution scalability and/or SNR scalability.

The multi-layer encoder (210) can include a single encoder used multiple times to encode different versions of video in different component bitstreams for simulcast transmission. Or, the multi-layer encoder (210) can include multiple encoders used to produce the respective component bitstreams in parallel. The multi-layer encoder (210) encodes video for a videoconference, video telephone call, streaming over the Internet, or other use scenario. The component bitstreams can differ from each other in terms of the number of layers of temporal, spatial and/or SNR scalability supported in the bitstream, if the bitstream is scalable at all. The component bitstreams can all use the same format (e.g., all AVC, all SVC), or different component bitstreams can use different formats (e.g., mix of AVC and SVC bitstreams, mix of H.264 and H.265 bitstreams). The component bitstreams can be encoded for the same profile and level of decoding, or different component bitstreams can be encoded for different profile and/or level of decoding to serve decoders with different capabilities.

The multi-layer encoder (210) multiplexes the component bitstreams together to form an MLE bitstream (221). In doing so, the multi-layer encoder (210) applies composition rules to facilitate demultiplexing and avoid contradictory assignments of values to parameters in the MLE bitstream (221). Example composition rules are described in section IV. Because the multi-layer encoder (210) includes both the encoder(s) and the bitstream MUX, the MLE encoder (210) can regulate values given to parameters so as to avoid conflicting assignments.

In the context of the H.264 standard, an MLE bitstream can include multiple SVC bitstreams multiplexed together, multiple AVC bitstreams multiplexed together or a mix of AVC and SVC bitstreams multiplexed together. For example, in some cases, an MLE bitstream includes multiple SVC bitstreams, where at least one of the SVC bitstreams provides SNR scalability and/or temporal scalability, and where each of the SVC bitstreams provides a version of the simulcast video with a different spatial resolution. For such cases, spatial resolution scalability is effectively provided through simulcast in a way that avoids the complications of inter-picture prediction in spatial scalability within a single SVC bitstream. More generally, the MLE bitstream is able to provide scalability with simulcast of AVC bitstreams and/or SVC bitstreams. Or, spatial scalability can be provided within a given SVC bitstream.

The MLE bitstreams are conveyed over a transport channel (230) using an appropriate communication protocol. The transport channel (230) can include the Internet or another computer network.

The MLE bitstream DEMUX (250) receives the MLE bitstream (221) and demultiplexes at least part of a component bitstream (251) from it. The MLE DEMUX (250) applies decomposition rules in demultiplexing. Example decomposition rules are described in section VII. The DEMUX (250) can be part of a multi-point conferencing unit in a videoconferencing system, network server that distributes streaming media, receiver, or other entity in a network environment. The operations of the DEMUX (250) depend on its role.

In a multi-point conferencing unit, the DEMUX (250) separates the MLE bitstream (221) into component bitstreams (or subsets of layers thereof) (251) for delivery to decoders (271, 272, ..., 27n), respectively. Considering the computational capabilities, screen size or quality setting of a given decoder, or considering the network bandwidth between the multi-point conferencing unit and the decoder, the DEMUX (250) selects all or part of a component bitstream (251) that is appropriate in terms of bit rate, spatial resolution, frame rate or other quality level. Different decoders (271, 272, ..., 27n) can thus receive different versions of the video from the MLE DEMUX (250).

Similarly, in a network server that delivers streaming media, the DEMUX (250) separates component bitstreams (or parts thereof) (251) for delivery to streaming media clients having the decoders (271, 272, ..., 27n), respectively. The server can choose the appropriate bitstream (251) for a given streaming media client based on computational capabilities, screen size or quality setting of the client, or based on available network bandwidth.

If the DEMUX (250) is part of a receiver associated with one of the decoders (271, 272, ..., 27n), the DEMUX (250) separates one of the component bitstreams (or parts thereof) (251) for delivery to the decoder. In this situation, the delivery of the entire MLE bitstream (221) is inefficient in that the MLE bitstream (221) includes bitstreams not decoded by the decoder. The same MLE bitstream (221) can be delivered to different devices, however, which may simplify stream management.

FIG. 2a shows three decoders (271, 272, ..., 27n). The number of decoders depends on implementation. Each decoder decodes at least part of a component bitstream (251) of encoded data compliant with the H.264 standard (also known as ISO-IEC 14496-10), SMPTE 421M standard, H.265/HEVC standard, another standard, or a proprietary format. Depending on the type of decoder, the input component bitstream (251) for decoding can be a non-scalable bitstream or scalable bitstream.

In FIG. 2b, the framework (202) includes one or more encoders (211, 212, ..., 21n) apart from an MLE MUX (220). Each encoder produces a component bitstream (219) of encoded data compliant with the H.264 standard (also known as ISO-IEC 14496-10), SMPTE 421M standard, H.265/HEVC standard, another standard, or a proprietary format. The output bitstream (219) from an encoder can be a non-scalable bitstream or scalable bitstream. The MLE MUX (220) receives the component bitstreams (219) and multiplexes the component bitstreams together to form an MLE bitstream (221). As in FIG. 2a, the MUX applies composition rules. Because the MLE MUX (220) is separate from the encoder(s) (211, 212, ..., 21n), however, the MUX (220) does not directly regulate values given to parameters so as to avoid contradictory assignments of values to parameters in the MLE bitstream (221). Instead, the MLE MUX (220) rewrites the values of the parameters to avoid conflicting assignments. Section V describes example approaches to rewriting values of syntax elements in a way that avoids bit shifting in data units of the component bitstreams (219). The transport channel (230), DEMUX (250) and decoder(s) (271, 272, ..., 27n) in the framework (202) of FIG. 2b operate as in the framework (201) of FIG. 2a.

III. Multiplexing Component Bitstreams into an MLE Bitstream

Figure 3:
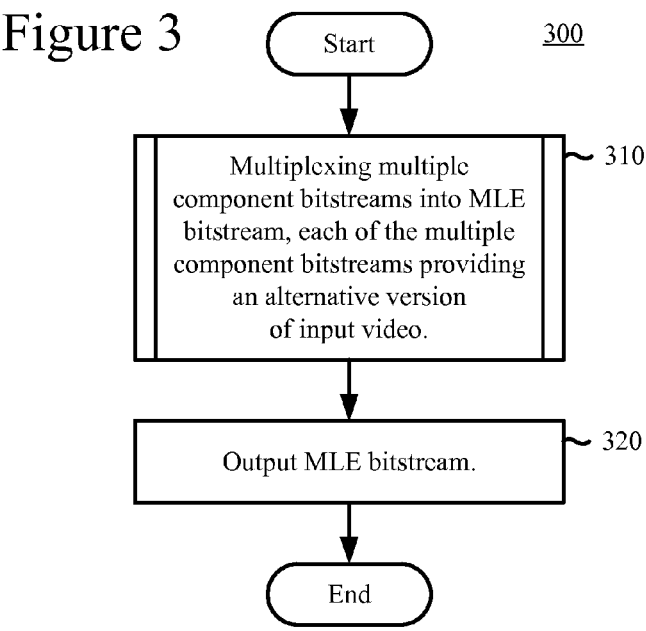
FIG. 3 is a flowchart illustrating a generalized technique for multiplexing multiple component bitstreams into a single MLE bitstream.

FIG. 3 shows a generalized technique (300) for multiplexing component bitstreams into an MLE bitstream. A MUX such as the MLE MUX (220) in FIG. 2b, MUX in the MLE encoder (210) in FIG. 2a, or other MUX performs the technique (300).

To start, the MUX multiplexes (310) component bitstreams into an MLE bitstream. Each of the component bitstreams provides an alternative version of input video. Collectively, the component bitstreams provide temporal scalability, spatial resolution scalability and/or SNR scalability. As used herein, the term SNR scalability generally refers to scalability in the level of distortion introduced during encoding, usually through quantization or a combination of quantization with filtering or another encoding mechanism. In some use scenarios, at least one of the component bitstreams is a scalable bitstream that includes a base layer and at least one enhancement layer. The base layer can represent a first temporal resolution of the input video, with the enhancement layer representing a second temporal resolution higher than the first temporal resolution. Or, the base layer can represent a first SNR level of the input video, with the enhancement layer representing a second SNR level higher than the first SNR level. Or, each of the component bitstreams can provide temporal scalability and/or SNR scalability within that component bitstream, with the component bitstreams together providing multiple spatial resolution options for simulcast versions of video in different component bitstreams. Or, a given component bitstream can support spatial scalability. Section VIII describes various combinations of component bitstreams that provide temporal, spatial and/or SNR scalability. Aside from supporting different numbers of layers of temporal, spatial and/or SNR scalability, different component bitstreams can differ from each other in terms of format of decoding (e.g., H.264 versus H.265) and/or profile/level of decoding for a given format (e.g., Baseline profile versus High profile for the H.264 standard, Baseline profile/level 1 versus Baseline profile/level 2 for the H.264 standard).

Figure 4:
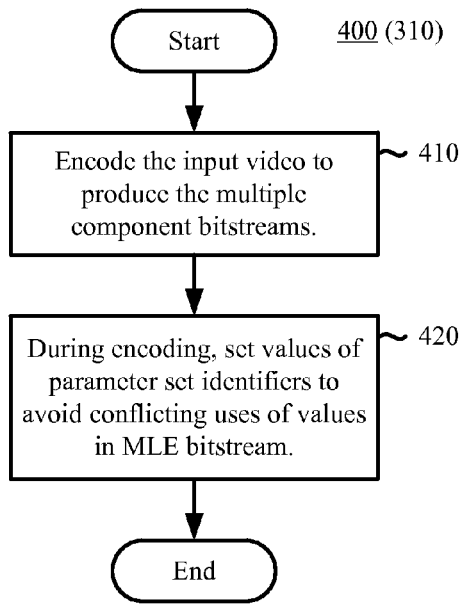
FIGS. 4 and 5 are flowcharts illustrating example approaches to performing the multiplexing.

The details of the multiplexing (310) depend on implementation. FIG. 4 shows an approach (400) to setting values of parameters of data units during multiplexing (310) when the MUX is integrated with the encoder(s) that produce the component bitstreams. In this approach (400), the input video is encoded (410) to produce the component bitstreams. During the encoding, values of at least some parameter set identifiers in the component bitstreams are set (420) to avoid conflicting uses of the values in the MLE bitstream.

Figure 5:
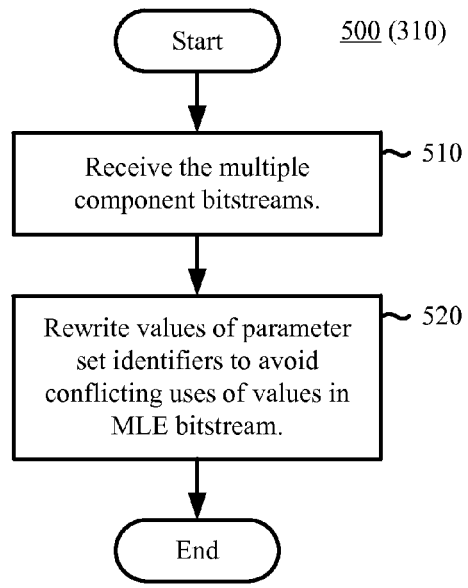

FIG. 5 shows another approach (500) to setting values of parameters of data units during multiplexing (310) when the MUX is separate from the encoder(s) that produce the component bitstreams. For example, the MUX accepts a component bitstream from a hardware encoder device (e.g., web camera, smart phone) that produces a single bitstream as output. In this approach (500), the MUX receives (510) the component bitstreams and rewrites (520) values of at least some parameter set identifiers in the component bitstreams to avoid conflicting uses of the values in the MLE bitstream. For example, as part of the rewriting, for a given value, the MUX identifies a set of candidate values appropriate for the given value based on number of bits in the given value, selects a new value from the set of candidate values, and replaces the given value with the new value. The set of candidate values can include one or more candidate values having the number of bits in the given value and candidate values having one or more bytes plus the number of bits in the given value. When candidate values are defined in this way, the rewriting can be performed without bit shifting operations.

Alternatively, the MUX sets such values for the component bitstreams in some other way. For example, the MUX can directly regulate the setting of values for some encoders, and perform rewriting of values in bitstreams received from other encoders.

As part of the multiplexing, the MUX can insert marker data units in the MLE bitstream to facilitate demultiplexing. Each of the marker data units includes a priority identifier (PRID) and one or more quality layer identifiers such as a quality identifier (QID), dependency identifier (DID) and/or temporal identifier (TID). The PRID associates a video data unit with a given layer of one of the component bitstreams.

In terms of H.264 syntax, NAL units have different types. NAL units for base layer video have a NAL unit type from 1 to 5 for slices of pictures. NAL units for temporal scalability layer video can also have a NAL unit type from 1 to 5 for slices of pictures. An AVC decoder can decode slice NAL units for base layer video and temporal scalability layer video. Such slice NAL units do not include PRID syntax elements, however. Therefore, ahead of such NAL units in the MLE bitstream, the MUX inserts marker data units that mark the slice NAL units with appropriate priority and quality layer identifiers (QID, DID and/or TID). In contrast, a NAL unit for an SVC extension slice is marked with NAL unit type of 20 and already includes priority and quality layer identifiers (QID, DID and/or TID) used for SVC decoding. Marker data units are not inserted ahead of such NAL units in the MLE bitstream. For example, a marker data unit has NAL unit type of 14 (prefix NAL unit). An AVC decoder can discard the marker NAL units (and SVC extension slice data units), but an SVC decoder uses the marker NAL units to get PRIDs and quality layer identifiers (QIDs, DIDs and/or TIDs) for base layer video and temporal scalability layer video for purposes of SVC decoding.

In setting values of parameters in the data units of the component bitstreams and inserting marker data units, the MUX enforces composition rules for MLE bitstreams. Section IV describes examples of composition rules.

Returning to FIG. 3, after the multiplexing (310), the MUX outputs (320) the MLE bitstream. The MUX can output (320) for transmission over a network connection or to storage media. The MLE bitstream can be formatted as a single bitstream, even though it contains data units for multiple component bitstreams, each of which is itself a valid single bitstream. This provides compatibility with operating systems and other software or hardware equipment adapted to process a single bitstream for a given operation in a media pipeline. Because the MLE bitstream follows rules for formatting as a single bitstream, it can be handled as a single bitstream for purposes of buffering, storage, transmission, etc.

IV. Example Composition Rules

A MUX enforces composition rules when multiplexing component bitstreams into an MLE bitstream. Some of the composition rules facilitate demultiplexing by identifying data units in the MLE bitstream as belonging to particular bitstreams or layers in bitstreams. By setting PRID carefully, the MUX can avoid confusion about how data units in the MLE bitstream map to appropriate layers of component bitstreams.

For example, according to a first composition rule, PRIDs identify layers of the component bitstreams. The PRIDs can be directly included in some types of data units. If syntax does not support signaling of PRIDs in video data units, the PRIDs can be included in marker data units inserted in the MLE bitstream. For H.264 bitstreams, the syntax element priority_id (example of PRID) is used as an identifier for layers across bitstreams. For an ordinary AVC stream, a prefix NAL unit with nal_unit_type 14 is inserted in front of each VCL (Video Coding Layer) NAL unit to carry the value of PRID. For enhancement information in an SVC stream, the PRID is directly set in NAL units for extension slices of the SVC bitstream.

According to a second composition rule, each of the component bitstreams is assigned a non-overlapping range of PRIDs. Within the range of PRIDs for a given component bitstream, a base layer for the component bitstream has the lowest PRID in the range. In terms of H.264 syntax, each component bitstream (SVC or AVC-only) is assigned a non-overlapped range of PRID. In each component bitstream, base layer VCL NAL units (for which the values of temporal_id (example of TID), quality_id (example of QID), and dependency_id (example of DID) are 0) are assigned the lowest PRID in the range for that bitstream.

Other composition rules address potential conflicts between identifiers for parameter sets. In the H.264 standard, a SPS includes parameters that apply for decoding of a video sequence, and a PPS includes parameters that apply for decoding of a picture. A SPS identifier (SPSID) marks a SPS to differentiate it from other SPSs. Similarly, a PPS identifier (PPSID) marks a PPS to differentiate it from other PPSs. A PPS includes an SPSID to associate pictures with a SPS. A slice data unit for a slice includes a PPSID to associate the slice with a PPS to be used during decoding of the slice.

For example, according to a third composition rule, PPSIDs are unique across the multiple component bitstreams. For H.264 bitstreams, the value of the syntax element pic_parameter_set_id (example of PPSID) associated with each PPS NAL unit is unique across component bitstreams. Similarly, according to a fourth composition rule, SPSIDs are unique across the component bitstreams. In terms of H.264 syntax, the value of seq_parameter_set_id (example of SPSID) associated with each SPS NAL unit is unique across component bitstreams. Also, the value of the syntax element SPSID associated with each subset SPS (SSPS) NAL unit (if present) is unique across component bitstreams.

Alternatively, the MUX applies other and/or additional composition rules. For example, according to another composition rule for H.264 bitstreams, when present, other non-VCL NAL units are associated with the bitstream corresponding to the immediately following VCL NAL unit.

V. Rewriting Without Bit Shifting

Figure 6:
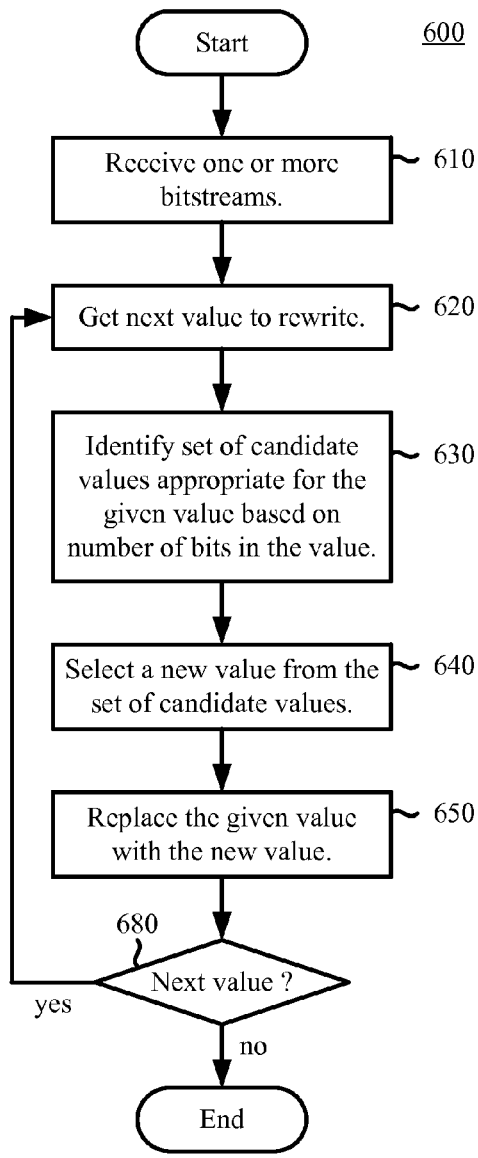
FIG. 6 is a flowchart illustrating an example technique for rewriting values of syntax elements in a bitstream.

FIG. 6 shows an example technique (600) for rewriting values of syntax elements in a bitstream so as to avoid bit shifting. A MUX such as the MLE MUX (220) in FIG. 2b, MUX in the MLE encoder (210) in FIG. 2a, or other MUX performs the technique (600), or another type of bitstream rewriting tool performs the technique (600).

To start, the bitstream rewriting tool receives (610) a bitstream or bitstreams. The bitstream rewriting tool then rewrites values of at least one syntax element in a bitstream. For example, the syntax element whose values are rewritten is a PPSID whose values are variable-length coded in the bitstream(s). Alternatively, the bitstream rewriting tool rewrites values for other and/or additional syntax elements. The bitstream rewriting tool iteratively repeats the rewriting process for the values of the syntax element(s) to be rewritten in the bitstream(s).

For a given value, the bitstream syntax tool gets (620) the value and identifies (630) a set of candidate values appropriate for the given value based on number of bits in the given value. The bitstream rewriting tool selects (640) a new value from the set of candidate values, skipping any value that has already been assigned during the rewriting process, and replaces (650) the given value with the new value. The bitstream rewriting tool continues (680) with the next value, if any.

For example, the set of candidate values includes one or more candidate values having the number of bits in the given value, and potentially includes candidate values with one or more bytes plus the number of bits in the given value. So, if a given value has 5 bits, the set of candidate values includes candidate values with 5 bits. The candidate value set can also include candidate values with 13 bits, 21 bits, and so on. In this way, when the given value is replaced with the new value, the given value is simply overwritten if the new value has the same number of bits as the given value. Otherwise (if the new value has a different number of bits than the given value), the data is byte shifted by an appropriate number of bytes to make room for the new value, and the new value is written in the bitstream. In this way, bit shifting operations are avoided. The rewriting may use byte shift operations, but byte shift operations are simpler to implement than bit shift operations.

In particular, the bitstream rewriting technique (600) explained with reference to FIG. 6 can be used to adjust PPSID values such that PPSID values are unique across component bitstreams of an MLE bitstream. For example, when component H.264 bitstreams have been generated by different individual encoders, a MUX can multiplex the H.264 bitstreams into an MLE bitstream. The MUX inserts prefix NAL units for VCL NAL units whose NAL unit type is from 1 to 5 in ordinary AVC bitstreams. The MUX sets appropriate values of PRID in prefix and VCL NAL unit headers based on the above-mentioned H.264 MLE composition rules. The MUX also adjusts values of PPSID and SPSID in PPS NAL units, SPS NAL units, and SSPS NAL units (if present) based on the above-mentioned composition rules. Finally, the MUX adjusts values of PPSID in VCL NAL unit headers such that each VCL NAL unit references the correct PPS, which is the PPS appropriate for the layer of the bitstream that includes that VCL NAL unit.

For a VCL NAL unit, the syntax element PPSID is part of a slice header and is coded using Exp-Golomb coding as shown in the following table.

TABLE 1

Bit Strings and Coded Numbers for Exp-Golomb Coding

| Bitstream Form | Range of Coded Numbers |
| --- | --- |
| 1 | 0 |
| 0 1 $x_0$ | 1 ... 2 |
| 0 0 1 $x_1$ $x_0$ | 3 ... 6 |
| 0 0 0 1 $x_2$ $x_1$ $x_0$ | 7 ... 14 |
| 0 0 0 0 1 $x_3$ $x_2$ $x_1$ $x_0$ | 15 ... 30 |
| 0 0 0 0 0 1 $x_4$ $x_3$ $x_2$ $x_1$ $x_0$ | 31 ... 62 |
| ... | ... |

In Table 1, the bit string "1" represents the value 0. The bit string "0 1 $x_0$" can represent the value 1 or 2, depending on the value of the bit $x_0$ after the prefix "0 1." The bit string "0 0 1 $x_1$ $x_0$" can represent the value 3, 4, 5 or 6 depending on the values of the two bits $x_1$ $x_0$ after the prefix "0 0 1" (binary value 00 for 3, binary value 01 for 4, binary value 10 for 5, and binary value 11 for 6). According to the H.264 standard, Exp-Golomb bit strings can be entropy coded using context-adaptive variable length coding (CAVLC) or context-adaptive binary arithmetic coding (CABAC). For any bit string in Table 1, there are other bit strings whose lengths differ by a multiple of 8 bits, or one byte. For example, the bit string "0 1 $x_0$" has three bits, and the bit string "0 0 0 0 0 1 $x_4$ $x_3$ $x_2$ $x_1$ $x_0$" has eleven bits.

When the value of a PPSID is encoded using CAVLC, a change to its value may cause a change to the length of the slice header for a slice, which may in turn require bit shifting of slice data for the slice to make room for the new PPSID value. Bit shifting operations have a high cost, especially when performed repetitively for slice data, which usually constitutes most of a H.264 bitstream.

Thus, the MUX adjusts the values of PPSID in slice headers in a way that avoids bit shifting operations. For a value of PPSID coded with i bits, the MUX assigns a new value from the set of candidate values for i bits such that the values of PPSID in the MLE bitstream satisfy the MLE composition rules for uniqueness of PPSID values. The MUX skips any value in the candidate value set that has already been assigned in the rewriting. For example, for a value of PPSID with 7 bits, the MUX assigns a value from 7 to 14. In this case, the length of the slice header is unchanged. If the set of candidate values for i bits is too small (all values already assigned), the MUX extends the set of candidate values to include values with i+8 bits, then i+16 bits, and so forth. For example, if the 7-bit candidate values from 7 to 14 have already been assigned, the MUX extends the set of candidate values to include 15-bit values 127 to 254. The MUX iteratively repeats the rewriting for the next value of PPSID.

This way of rewriting values in component bitstreams is especially useful when different encoders, outside the control of the MUX, generate the component bitstreams. In such scenarios, it may be difficult to coordinate the assignment of values for PPSID, SPSID, PRID, etc. according to the MLE composition rules. The MUX can quickly rewrite values, using byte shifting operations if appropriate, to enforce the MLE composition rules.

The same approach can be used to rewrite other syntax elements or rewrite PPSID in locations other than slice headers. For example, a MUX can use the approach to rewrite SPSID values in SPS NAL units and PPS NAL units. Or, a MUX can use the approach to rewrite PPSID values in PPS NAL units. Some syntax elements are already simple to rewrite without bit shifting, however. For example, the MUX can simply overwrite a fixed length field for PRID with no change in length of data unit. Other syntax elements have variable length (so changing their value could change the length of data units), but the syntax elements occur relatively rarely, or the data units including the syntax elements are short. For example, SPSID values in SPS NAL units and PPS NAL units have variable length but are relatively rare, and the NAL units in question are short. So, the cost of bit shifting operations may be acceptable, and the MUX can simply reassign SPSID values. Also, when an H.264 bitstream uses CABAC for PPSID values, the MUX can account for adjustments in PPSID values by simply changing how stuffing bits are used to pad to byte alignment.

VI. Demultiplexing Component Bitstreams from an MLE Bitstream

Figure 7:
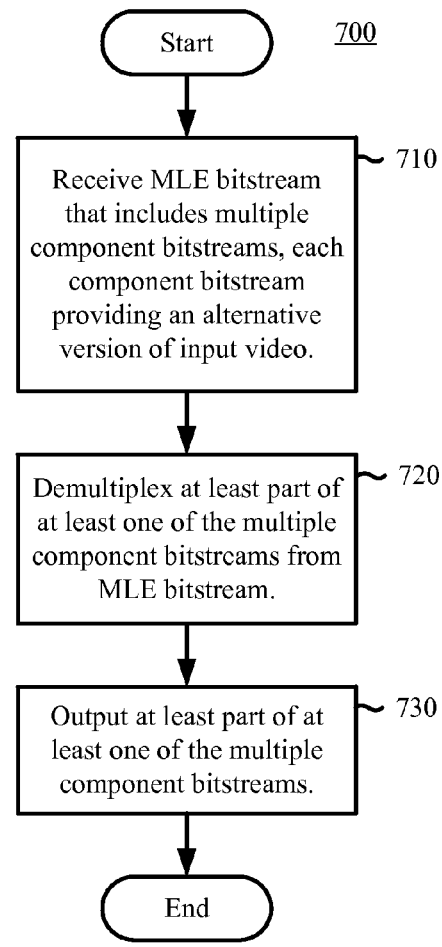
FIG. 7 is a flowchart illustrating a generalized technique for demultiplexing at least part of a component bitstream from an MLE bitstream.

FIG. 7 shows a generalized technique (700) for demultiplexing a component bitstream or layers thereof from an MLE bitstream. A DEMUX such as the DEMUX (250) in FIGS. 2a and 2b or other DEMUX performs the technique (700). The DEMUX can be part of a multipoint conferencing unit, network server, receiver or other type of computing system.

To start, the DEMUX receives (710) an MLE bitstream that includes multiple component bitstreams. Each of the component bitstreams provides an alternative version of input video. Collectively, the component bitstreams provide temporal scalability, spatial resolution scalability and/or SNR scalability, as described in sections III and VIII.

The DEMUX demultiplexes (720) at least part of at least one of the component bitstreams from the MLE bitstream. The details of the demultiplexing (720) depend on implementation. As part of the demultiplexing, the DEMUX can parse marker data units in the MLE bitstream and perform the demultiplexing based at least in part on the marker data units. Each of the marker data units includes a PRID and one or more quality layer identifiers. Section III describes examples of marker data units. In identifying and separating data units for layers of component bitstreams in the MLE bitstream, the DEMUX follows decomposition rules for MLE bitstreams. Section VII describes examples of decomposition rules. The DEMUX then outputs (730) the at least part of at least one of the component bitstreams.

VII. Example Decomposition Rules

A DEMUX follows decomposition rules when demultiplexing from an MLE bitstream. Some of the decomposition rules relate to identification of layers with which data units are associated.

For example, according to a first decomposition rule, a base layer for each of the component bitstreams has a PRID and one or more zero-value quality layer identifiers that mark the layer as a base layer. In terms of H.264 syntax, base layer VCL NAL units of a component bitstream have a zero-value TID, zero-value QID and zero-value DID. Within a range of PRID values associated with a bitstream, base layer data units have the lowest PRID value in the range. The PRID values for the base layer data units can be signaled in marker data units.

According to a second decomposition rule, a given non-base layer of any one of the component bitstreams has a PRID that, relative to the PRIDs of the base layers, indicates one of the component bitstreams for the given non-base layer. In terms of H.264 syntax, a non-base layer VCL NAL unit is associated with the component bitstream for which the value of PRID of the base layer VCL units is lower than and closest to the value of PRID of the non-base layer VCL NAL unit. For example, if base layer VCL NAL units for a first component bitstream have PRID of 0, and base layer VCL NAL units for a second component have PRID of 3, a PRID of 2 indicates a VCL NAL unit is a non-base layer VCL NAL unit for the first component bitstream.

Other decomposition rules help a DEMUX associate slice data units with an appropriate PPS and SPS for decoding. In general, these decomposition rules take advantage of the uniqueness of PPSIDs and SPSIDs within an MLE bitstream. For example, according to a third decomposition rule, a PPSID in a slice data unit identifies a corresponding PPS data unit to use in decoding of the slice data unit. For an H.264 bitstream, for a value of PPSID in a VCL NAL unit, the VCL NAL unit is associated with the PPS NAL unit have the same value of PPSID. Similarly, according to a fourth decomposition rule, a SPSID in a PPS references a corresponding SPS data unit to use in decoding of slice data units associated with the PPS. For H.264 syntax, for a value of SPSID in a PPS, VCL NAL units referencing that PPS are associated with the SPS NAL unit having the same value of SPSID. Also, for SSPS NAL units, for a value of SPSID in a PPS, any type-20 VCL NAL units referencing that PPS are associated with the SSPS NAL unit having the same value of SPSID.

Alternatively, the DEMUX applies other and/or additional decomposition rules. For example, according to another decomposition rule for H.264 bitstreams, when present, other non-VCL NAL units are associated with the bitstream corresponding to the next following VCL NAL unit.

VIII. MLE Bitstreams in Example SVC/AVC Implementation

In an example SVC/AVC implementation, the MLE framework supports a wide range of hardware and software H.264 encoders with different capabilities targeting various applications and scenarios (from low-end mobile phone video chat, up to high-end telepresence systems). The framework uses a tiered approach from low to high capabilities that is designed to allow these different encoders to be used in a unified video system.

Five modes are defined, ranging from AVC (non-scalable) single-layer simulcast streams to full SVC streams in simulcast. Each simulcast stream may have different resolutions, different frame rates, or/and different number of SNR layers. With the incremental scalability between modes, existing device manufacturers who have produced AVC encoders may be able to use the encoders in larger systems. The modes include:

Mode 0: non-scalable single layer AVC bitstream, with one or more simulcast streams.

Mode 1: SVC temporal scalability with hierarchical P pictures in a stream, with one or more simulcast streams.

Mode 2q: SVC temporal scalability+quality/SNR scalability in a stream, with one or more simulcast streams.

Mode 2s: SVC temporal scalability+spatial scalability in a stream, with one or more simulcast streams.

Mode 3: Full SVC scalability (temporal scalability+SNR scalability+spatial scalability) in a stream, with one or more simulcast streams.

Encoders that conform to higher level modes include the capabilities of encoding bitstreams associated with lower level modes. For example, encoders that conform to Mode 2q are able to generate a single-layer AVC stream (mode 0) or mode-1 stream. A mode-3 encoder can produce a bitstream conformant with mode 0, mode 1, mode 2q or mode 2s. A mode-2s encoder can produce a bitstream conformant with mode 0 or mode 1, and a mode-2q encoder can produce a bitstream conformant with mode 0 or mode 1.

Mode and capability negotiation between encoders and decoders can use any available mechanism and can be performed at run-time or in advance of encoding and decoding. Encoders that conform to a particular mode consider certain constraints. When encoding a mode-0 bitstream, the encoder conforms to the Constrained Baseline profile or Unified Communication (UC) Constrained High toolset. When encoding a mode-1 bitstream, the encoder conforms to the UC Constrained High toolset. When encoding a bitstream in mode 2q, or 3, the encoder conforms to the UC Scalable Constrained Baseline toolset and the UC Scalable Constrained High toolset.

The UC Constrained High and UC Scalable Constrained High toolsets are subsets of the High and Scalable High profiles, respectively. Using these two toolsets assures consistency between base and enhancement layers. Existing H.264 SVC encoders can use different sets of tools between Baseline and Scalable Baseline profiles, or between High and Scalable High profiles. For example, when using Scalable Baseline profile, CABAC is not allowed for the base layer, while it may be allowed for the enhancement layers. Also, the UC Constrained High and UC Scalable Constrained High toolsets include only those tools useful for conferencing applications. For example, flexible macroblock ordering and arbitrary slice ordering are not especially useful for conferencing applications. The UC Scalable Constrained Baseline toolset differs from the UC Scalable Constrained High toolset in that the base layer obeys the Constrained Baseline profile. This enables legacy AVC decoders that only support the Constrained Baseline profile to decode and play back base layer video.

The UC Constrained High toolset contains the tools defined in the Constrained Baseline profile, including I and P slices, 8 bits per sample, 4:2:0 format, 4×4 transform, and CAVLC. The UC Constrained High toolset also contains some Main/High profile tools, including CABAC, 8×8 transform, quantizer scaling matrices, and QP for Cb/Cr. The use of UC Constrained High toolset for bitstreams is signaled at system level.

For the UC Scalable Constrained High toolset, the base layer bitstream obeys the UC Constrained High toolset. The enhancement layer bitstream contains the tools defined in the UC Constrained High toolset plus full temporal and SNR scalability. Spatial scalability is restricted to resolution ratios of 1.5 and 2 between successive spatial layers in both horizontal and vertical direction, and there is no support for extended spatial scalability. The use of UC Scalable Constrained High toolset is signaled at system level.

The UC Scalable Constrained Baseline includes the tools defined in the Constrained Baseline profile. The enhancement layer bitstream contains the tools defined in the UC Scalable Constrained High toolset. The use of UC Scalable Constrained Baseline toolset is signaled at system level.

Video encoded in the SVC/AVC implementation uses byte stream format as described in Annex B of the H.264 standard. For purposes of MLE bitstreams, any zero-valued bytes that appear at the end of a byte-stream NAL unit are considered part of the NAL unit.

The MLE framework supports a variety of frame rates and spatial resolutions. Examples of supported resolutions and frame rates are provided below. In general, for purposes of spatial scalability, vertical or horizontal resolution differs by a factor of 1.5 or 2 between successive layers. Similarly, for purposes of simulcast streams at different resolutions, vertical or horizontal resolution differs by a factor that is dividable by 1, 1.5 or 2 between successive streams. When different frame rates are supported for temporal scalability, the frame rates differ by a multiple of two. The bitstream can include a level indicator that corresponds to supported frame rates and spatial resolutions.

In the respective modes, the possible combinations of number of simulcast streams, number of scalability layers, frame rates and spatial resolutions are subject to limits on processing capabilities, which may be expressed in terms of maximum macroblock processing rates. Typically, the relevant total is the sum of macroblocks per second for the highest quality layer across the simulcast streams.

For any mode, to interleave multiple streams into a single MLE bitstream, the encoder(s) or a bitstream MUX generates unique values of SPSID and PPSID values across simulcast streams, to facilitate the extraction of one stream from the interleaved MLE bitstream. When present, SEI messages are associated with the stream corresponding to the immediately following NAL unit. In general, NAL units containing pictures captured at the same time are ordered according to their PRID in the bitstream. If such ordering increases encoding latency too much, however, encoders may order NAL units with larger value of PRID before NAL units with smaller value of PRID. NAL units at different timestamps are not interleaved.

FIGS. 8-26 show data units and values of selected syntax elements for example MLE bitstreams. In these figures, NAL units for VCL NAL units associated with even-valued picture order count values are shown in shaded cells. The following acronyms are used in the figures.

| | |
|---|---|
| NAL | network abstraction layer, where a NAL unit includes a one-byte header and payload byte string |
| PPS | picture parameter set |
| SPS | sequence parameter set |
| SSPS | subset sequence parameter set |
| IDR | instantaneous data refresh (or instantaneous decoding refresh) |
| PPSID | picture parameter set identifier, e.g., picture_parameter_set_id in H.264 standard |
| SPSID | sequence parameter set identifier, e.g., seq_parameter_set_id in H.264 standard |
| PRID | priority identifier, e.g., priority_id in H.264 standard |
| POC | picture order count |
| TID | temporal identifier, e.g., temporal_id in H.264 standard |
| DID | dependency identifier, e.g., dependency_id in H.264 standard |
| QID | quality identifier, e.g., quality_id in H.264 standard |

A. Mode 0 Examples

In mode 0, one or more encoders can produce non-scalable single-layer AVC bitstream, and simulcast streams are permitted. Decoding of a single-layer bitstream uses one reference frame at a time. In display order, each P frame uses the immediate previously reconstructed frame as its reference frame.

An MLE bitstream can include multiple independent simulcast mode-0 streams generated from an encoder or encoders. In this case, each independent stream has a different bitrate and is conformant to mode 0. For each simulcast stream, the encoder or bitstream MUX inserts a prefix NAL unit (type 14) in front of the first coded slice of each frame. The prefix NAL signals the relative importance of the stream among the streams using the syntax element PRID, with 0 representing the lowest bitrate stream, 1 the next lowest bitrate stream, and so forth (lower values mean higher priority). The values of PRID in prefix NAL units can be used by a multipoint control unit or other network node to identify the priority of a simulcast stream. For each prefix NAL, the values of DID, QID and TID are equal to 0. The values of no_inter_layer_pred_flag, discardable_flag and output_flag are 1. The value of use_ref_base_pic_flag is 0. The prefix NAL units are discarded by legacy AVC decoders that are not SVC-compatible, so that the bitstreams can still be decoded.

The following table shows an example of three simulcast mode-0 streams with resolutions, bitrates, and frame rates of: 720p 30 fps at 1.5 Mbps, 360p 30 fps at 600 Kbps, and 180p 15 fps at 250 Kbps. Each of the mode-0 streams is a non-scalable singe-layer AVC stream. The table also lists PRID values for the streams for the data units shown in FIG. 8-11.

TABLE 2

Example Simulcast Streams in MLE Mode 0

| | Base layer |
|---|---|
| simulcast stream 1 | 720p 30 fps (PRID 0) |
| simulcast stream 2 | 360p 30 fps (PRID 1) |
| simulcast stream 3 | 180p 15 fps (PRID 2) |

FIGS. 8-10 illustrate data units in conformant bitstreams when the three mode-0 streams are transmitted separately (e.g., for different sessions). FIG. 8 shows data units (800) for the 180p 15 fps mode-0 stream. FIGS. 9 and 10 show data units (900) for the 360p 30 fps mode-0 stream and data units (1000) for the 720p 30 fps mode-0 stream, respectively. FIG. 11 illustrates data units (1100) in a conformant MLE bitstream in which data units for the three mode-0 streams are interleaved (e.g., for a single session).

B. Mode 1 Examples

In mode 1, one or more encoders can produce SVC bitstreams with temporal scalability using hierarchical P pictures in a given component bitstream, and simulcast streams are permitted. In decoding a mode-1 bitstream, one reference frame at a time is used if there are two temporal layers, and two reference frames at a time are used if there are three or more temporal layers. A hierarchical P-picture prediction structure is used to achieve temporal scalability. The base layer is encoded as in mode 0. The frames in a temporal enhancement layer only use the immediate previously reconstructed frame in the lower layer as the reference frame. Thus, each layer represents a temporal scale.

For mode 1, a coded slice NAL unit (type 1 or 5) follows a prefix NAL unit (type 14) for enhancement layer frames to support temporal scalability. The bitstream does not use coded slice extension NAL units (type 20) in mode 1. The prefix NAL signals the importance of given layer relative to other layers using the syntax element PRID, with 0 representing the base layer, 1 representing the next higher layer (or equivalently the first enhancement layer), and so forth.

For a given prefix NAL, the value of TID specifies the hierarchical dependency of a temporal layer relative to other layers, with 0 representing the base temporal layer, 1 the first temporal enhancement layer, 2 the second temporal enhancement layer, and so forth. The values of DID and QID are equal to 0. The values of no_inter_layer_pred_flag, discardable_flag and output_flag are 1. The value of use_ref_base_pic_flag is 0. The decoding order is the same as display order—B slices are not used. The prefix NAL units can be discarded by legacy AVC decoders that are not SVC-compatible, so that the mode-1 bitstream can still be decoded. Alternatively, temporal scalability is supported using coded slice extension NAL units (type 20), which are recognized by SVC decoders.

For example, for a two-layer temporal prediction structure, the base layer (temporal layer 0) includes even-numbered pictures 0, 2, 4, 6, and so on, and the first temporal scalability layer includes the odd-numbered pictures 1, 3, 5, 7, and so on, with each odd-numbered picture using the immediately preceding picture of the base layer as a reference picture. If the base temporal layer has a frame rate of 15 fps, the first temporal scalability layer also has a frame rate of 15 fps, and the overall frame rate is 30 fps.

For three-layer temporal prediction, a second temporal scalability layer can add a picture between each pair of pictures from the first two layers, with each second-temporal-layer picture using the immediately preceding picture as a reference picture. The base temporal layer provides pictures 0, 4, 8, . . . , and the first temporal scalability layer provides pictures 2, 6, 10, . . . The second temporal scalability layer provides pictures 1, 3, 5, 7, and so on. In this way, the frame rate can be doubled from layer to layer.

Similarly, for four-layer temporal prediction, a third temporal scalability layer can add a picture between each pair of pictures from the first three layers, with each third-temporal-layer picture using the immediately preceding picture as a reference picture. So, the base temporal layer provides pictures 0, 8, 16, . . . , the first temporal scalability layer provides pictures 4, 12, 20, . . . , and the second temporal scalability layer provides pictures 2, 6, 10, 14, . . . . The third temporal scalability layer provides pictures 1, 3, 5, 7, and so on. In this way, the frame rate can be doubled from layer to layer, for example, from 7.5 fps (base layer), to 15 fps (base layer and first temporal scalability layer), to 30 fps (base layer and two temporal scalability layers) up to 60 fps (all layers).

Encoders that conform to mode 1 are able to generate bitstreams with at least two temporal layers. Compared to mode 0, reference frames are used differently in mode 1 to support hierarchical P-picture prediction structures, and one additional memory buffer is used for reference frames when three or more temporal scalability layers are used.

An MLE bitstream can include multiple independent simulcast mode-1 streams generated from an encoder or encoders. Each mode-1 stream has a different bitrate and is conformant to mode 1, with temporal scalability embedded. When two or more independent mode-1 streams are generated, the encoder(s) adjust the base-layer value of PRID (that is, the value of PRID associated with base layer) of each mode-1 stream in order to signal the importance of the base temporal layers relative to other layers across the streams. The base-layer value of PRID for the lowest bitrate mode-1 stream is unchanged (equal to 0). The base-layer value of PRID for the next higher bitrate mode-1 stream is shifted up by one plus the value of PRID for the highest temporal scalability layer in the lowest bitrate mode-1 stream (such that values of PRID are in non-overlapping ranges for the respective mode-1 streams). The base-layer value of PRID for each other mode-1 stream is adjusted in a similar manner. Such adjustment assures a unique PRID is associated with each layer for each mode-1 stream, assures that lower temporal layers are given higher priority (that is, a lower PRID value) than higher temporal layers within a given mode-1 stream, and assures that lower bitrate mode-1 streams have higher priority than higher bitrate mode-1 streams.

The following table shows an example of three simulcast mode-1 streams with different spatial resolutions, bitrates, and frame rates. Each of the mode-1 streams is a temporally scalable AVC stream. The first stream includes layers for 720p 30 fps video at 1.5 Mbps, the second stream includes layers for 360p 30 fps video at 600 Kbps, and the third stream includes layers for 180p 15 fps video at 250 Kbps. For each of the 720p and 360p streams, there are two temporal scalability layers. For the 180p stream, there is only one temporal scalability layer. The table also lists PRID values for the layers of the streams for the data units shown in FIG. 12-15.

TABLE 3

Example Simulcast Streams in MLE Mode 1

|  | $2^{nd}$ temporal enhancement layer | $1^{st}$ temporal enhancement layer | base layer |
| --- | --- | --- | --- |
| simulcast stream 1 | 720p 30 fps (PRID 7) | 720p 15 fps (PRID 6) | 720p 7.5 fps (PRID 5) |
| simulcast stream 2 | 360p 30 fps (PRID 4) | 360p 15 fps (PRID 3) | 360p 7.5 fps (PRID 2) |
| simulcast stream 3 |  | 180p 15 fps (PRID 1) | 180p 7.5 fps (PRID 0) |

FIGS. 12-14 illustrate data units in conformant bitstreams when the three mode-1 streams are transmitted separately (e.g., for different sessions). FIG. 12 shows data units (1200) for the 180p 15 fps mode-1 stream. FIGS. 13 and 14 show data units (1300) for the 360p 30 fps mode-1 stream and data units (1400) for the 720p 30 fps mode-1 stream, respectively.

FIG. 15 illustrates data units (1500) in a conformant MLE bitstream in which data units for the three mode-1 streams are interleaved (e.g., for a single session).

C. Mode 2q Examples

In mode 2q, one or more encoders can produce scalable bitstreams that have temporal scalability and/or SNR scalability in a given component bitstream, and simulcast streams are permitted. In mode 2q, mode-1 encoding is applied first for temporal scalability. For the temporal base layer and temporal enhancement layer(s), SNR scalability can be applied to further divide the mode-2q streams into multiple SNR quality layers. A bitstream in the base SNR quality layer conforms to the mode-1 constraints.

Two-layer temporal scalability (base temporal layer and one temporal enhancement layer) can be extended to have multiple SNR quality layers as follows. A base temporal layer includes intra-coded pictures and predictively-coded pictures (I slices and P slices). Each base layer picture references, at most, the immediately previous picture in the base layer as a reference picture. For example, the pictures of the base temporal layer (base layer overall) are even-numbered pictures 0, 2, 4, 6, . . . . The temporal enhancement layer (enhancement layer 1 overall) includes the odd-numbered pictures 1, 3, 5, 7, . . . , with each odd-numbered picture using the immediately preceding picture of the base temporal layer as a reference picture. The pictures of the base layer and temporal enhancement layer are encoded at a base SNR level. The SNR enhancement layer (enhancement layer 2 overall) includes SNR enhancement information (EI slices and EP slices) for the pictures of both the base layer and the temporal enhancement layer. Each I slice or P slice in the base layer or temporal enhancement layer has a corresponding EI slice or EP slice in the SNR enhancement layer, which may be encoded using spatial prediction from the appropriate I slice or P slice. In addition, EP slices in the SNR enhancement layer can be encoded using temporal prediction from EI or EP slices.

For example, for a stream of 720p video at 30 fps, the base temporal layer is 720p video at 15 fps with a quantization parameter of 38. The temporal enhancement layer is 720p video at 15 fps with a quantization parameter of 38 (30 fps when combined with the base temporal layer). The SNR enhancement layer is 720p video at 30 fps with a quantization parameter of 34, including EI slices and EP splices for pictures in both the base temporal layer and temporal enhancement layer.

In mode 2q, three variations of SNR scalability are supported: a coarse-grain scalability (CGS) non-rewrite mode with two enhancement layers, a CGS rewrite mode with two enhancement layers, and a medium-grain scalability (MGS) with one enhancement layer (multiple sub-layers). For the MGS mode, the encoder can use 4×4 or 8×8 transform mode and set the number of sub-layers so that fewer or more scales are created. The minimum number of sub-layers is 2, and the maximum number of sub-layers is 4. The number of temporal layers follows the guidelines for mode 1. The CGS rewrite mode is as defined in Annex G of the H.264 standard. A SNR scalability bitstream utilizing the CGS rewrite mode can be converted to an AVC bitstream without fully decoding the SNR scalability bitstream. Encoders that conform to mode 2q support at least one of the three SNR modes. Decoders that conform to mode 2q support the three SNR modes.

The syntax element PRID in an SVC extension slice header signals the importance of a SNR layer relative to other layers across bitstreams. In mode 2q, the value of PRID for the first SNR enhancement layer of a given stream is the value of PRID for the highest temporal layer of the stream plus one. The value of PRID is incremented by one for the next SNR enhancement layer of the stream, and so forth. The decoding order is the same as the display order in scalability layers for mode 2q.

When a CGS mode is in use, the value of QID is 0 in SVC extension slice headers. The value of DID is 0 for the base layer, 1 for the first SNR enhancement layer, 2 for the second SNR enhancement layer, and so forth.

When MGS mode is in use, the value of DID is 0 in SVC extension slice headers. The QID is 0 for the base layer, 1 for the first MGS sub-layer, 2 for the second MGS sub-layer, and so forth. In SVC extension slice headers, the values of TID are the same as those in the corresponding SVC base layer frames, respectively. The value of no_inter_layer_pred_flag is 1. The values of output_flag, discardable_flag and use_ref_base_pic_flag are 0 for the SVC base layer (for which DID and QID are both equal to 0). The value of use_ref_base_pic_flag is 0 unless the slice is part of an MGS key frame. The values of discardable_flag and output_flag are 1 for slices associated with the largest value of DID in the coded picture, and 0 otherwise.

The constraints for temporal layers in mode 2q follow the constraints for mode 1. At least two temporal layers are used for each resolution/frame rate entry. At least two layers of SNR scalability are used for each entry (one base layer and one SNR enhancement layer) in CGS rewrite and CGS non-rewrite modes, and at least two sub-layers in MGS mode.

An MLE bitstream can include multiple independent simulcast mode-2q streams generated from an encoder or encoders. In this case, each independent stream has a different bitrate and is conformant to mode 2q with temporal and SNR scalability modes embedded. The encoder(s) adjust the base-layer value of PRID of each stream in order to signal the importance of the base layer relative to other layers across the streams. The base-layer value of PRID for the lowest bitrate stream is unchanged (equal to 0). The base-layer value of PRID for the next higher bitrate stream is shifted up by one plus the value of PRID for the highest layer in the lowest bitrate stream. The base-layer value of PRID for the rest of the streams is adjusted in a similar manner. Such adjustment assures a unique PRID is associated with each layer in each mode-2q stream, with lower layers being assigned higher priority (that is, a lower PRID value) than higher layers in a given mode-2q stream, and with lower bitrate streams being assigned higher priority that higher bitrate streams.

The following table shows an example of three simulcast mode-2q streams with different spatial resolutions, bitrates, and frame rates. Each of the mode-2q streams is temporally scalable, and the first two streams are also SNR scalable. The first stream includes layers for 720p 30 fps video at 1.25 Mbps, the second stream includes layers for 360p 30 fps video at 750 Kbps, and the third stream includes layers for 180p 30 fps video at 300 Kbps. For each of the 720p and 360p streams, there are two temporal scalability layers and two SNR scalability layers. For the 180p stream, there are two temporal scalability layers, but there is no SNR scalability. The table also lists PRID values for the layers of the streams for the data units shown in FIG. 16-19.

TABLE 4

Example Simulcast Streams in MLE Mode 2q

| | SNR enhancement layer | temporal enhancement layer | base layer |
|---|---|---|---|
| simulcast stream 1 | 720p 30 fps Quality 1 (PRID 7) | 720p 30 fps Quality 0 (PRID 6) | 720p 15 fps Quality 0 (PRID 5) |
| simulcast stream 2 | 360p 30 fps Quality 1 (PRID 4) | 360p 30 fps Quality 0 (PRID 3) | 360p 15 fps Quality 0 (PRID 2) |
| simulcast stream 3 | | 180p 30 fps Quality 0 (PRID 1) | 180p 15 fps Quality 0 (PRID 0) |

FIGS. 16-18 illustrate data units in conformant bitstreams when the three mode-2q streams are transmitted separately (e.g., for different sessions). FIG. 16 shows data units (1600) for the 180p 30 fps mode-2q stream. FIGS. 17 and 18 show data units (1700) for the 360p 30 fps mode-2q stream and data units (1800) for the 720p 30 fps mode-2q stream, respectively. The CGS mode is used for SNR scalability. FIG. 19 illustrates data units (1900) in a conformant MLE bitstream in which data units for the three mode-2q streams are interleaved (e.g., for a single session).

D. Mode 2s Examples

In mode 2s, one or more encoders can produce scalable bitstreams that have temporal scalability and/or spatial scalability in a given component bitstream, and simulcast streams are permitted. In mode 2s, mode-1 encoding is applied first for temporal scalability. For the temporal base layer and temporal enhancement layer(s), spatial scalability can be applied to further divide the mode-2s streams into multiple spatial resolution layers. A bitstream in the base spatial quality layer conforms to the mode-1 constraints.

Two-layer temporal scalability (base temporal layer and one temporal enhancement layer) can be extended to have multiple spatial quality layers as follows. A base temporal layer includes intra-coded pictures and predictively-coded pictures (I slices and P slices). Each base layer picture references, at most, the immediately previous picture in the base layer as a reference picture. For example, the pictures of the base temporal layer (base layer overall) are even-numbered pictures 0, 2, 4, 6, . . . . The temporal enhancement layer (enhancement layer 1 overall) includes the odd-numbered pictures 1, 3, 5, 7, and so on, with each odd-numbered picture using the immediately preceding picture of the base temporal layer as a reference picture. The pictures of the base layer and temporal enhancement layer are encoded at a base spatial resolution level. The spatial resolution enhancement layer (enhancement layer 2 overall) includes spatial resolution enhancement information (EI slices and EP slices) for the pictures of both the base layer and the temporal enhancement layer. Each I slice or P slice in the base layer or temporal enhancement layer has a corresponding EI slice or EP slice in the spatial resolution enhancement layer, which may be encoded using spatial prediction from the appropriate I slice or P slice. In addition, EP slices in the spatial enhancement layer can be encoded using temporal prediction.

For example, for a stream of 720p video at 30 fps, the base temporal layer is 360p video at 15 fps with a quantization parameter of 34. The temporal enhancement layer is 360p video at 15 fps with a quantization parameter of 34 (30 fps when combined with the base temporal layer). The spatial resolution enhancement layer is 720p video at 30 fps with a quantization parameter of 34, including EI slices and EP splices for pictures in both the base temporal layer and temporal enhancement layer from EI or EP slices.

Spatial scalability is restricted to resolution ratios of 1.5 and 2 between successive spatial layers in both horizontal and vertical directions. In mode 2s, there are at least two spatial layers (one base spatial layer and one enhancement spatial layer). The number of temporal layers follows the guidelines for mode 1.

The syntax element PRID in an SVC extension slice header signals the importance of a spatial resolution layer relative to other layers across bitstreams. In mode 2s, the value of PRID for the first spatial resolution enhancement layer of a given stream is the value of PRID for the highest temporal layer of the stream plus one. The value of PRID is incremented by one for the next spatial resolution enhancement layer of the stream, and so forth. The decoding order is the same as the display order in scalability layers for mode 2s.

An MLE bitstream can include multiple independent simulcast mode-2s streams generated from an encoder or encoders at the same time. In this case, each independent stream has a different bitrate and is conformant to mode 2s with temporal and spatial resolution scalability modes embedded. The encoder(s) adjust the base-layer value of PRID of each stream in order to signal the importance of the base layer relative to other layers across the streams. The base-layer value of PRID for the lowest bitrate stream is unchanged (equal to 0). The base-layer value of PRID for the next higher bitrate stream is shifted up by one plus the value of PRID for the highest layer in the lowest bitrate stream. The base-layer value of PRID for the rest of the streams is adjusted in a similar manner. Such adjustment assures a unique PRID is associated with each layer in each mode-2s stream, with lower layers being assigned higher priority (that is, a lower PRID value) than higher layers in a given mode-2s stream, and with lower bitrate streams being assigned higher priority that higher bitrate streams.

The following table shows an example of three simulcast mode-2s streams with different spatial resolutions, bitrates, and frame rates. Each of the mode-2s streams is temporally scalable, and the first two streams are also spatially scalable. The first stream includes layers for 720p 30 fps video at 1.25 Mbps, the second stream includes layers for 360p 30 fps video at 750 Kbps, and the third stream includes layers for 180p 30 fps video at 300 Kbps. For each of the 720p and 360p streams, there are two temporal scalability layers and two spatial scalability layers. For the 180p stream, there are two temporal scalability layers, but there is no spatial scalability. The table also lists PRID values for the layers of the streams for the data units shown in FIG. 20-23.

TABLE 5

Example Simulcast Streams in MLE Mode 2s

| | spatial enhancement layer | temporal enhancement layer | base layer |
|---|---|---|---|
| simulcast stream 1 | 720p 30 fps (PRID 7) | 480p 30 fps (PRID 6) | 480p 15 fps (PRID 5) |
| simulcast stream 2 | 360p 30 fps (PRID 4) | 240p 30 fps (PRID 3) | 240p 15 fps (PRID 2) |
| simulcast stream 3 | | 180p 30 fps (PRID 1) | 180p 15 fps (PRID 0) |

FIGS. 20-22 illustrate data units in conformant bitstreams when the three mode-2s streams are transmitted separately (e.g., for different sessions). FIG. 20 shows data units (2000) for the 180p 30 fps mode-2s stream. FIGS. 21 and 22 show data units (2100) for the 360p 30 fps mode-2s stream and data units (2200) for the 720p 30 fps mode-2s stream, respectively. FIG. 23 illustrates data units (2300) in a conformant MLE bitstream in which data units for the three mode-2s streams are interleaved (e.g., for a single session).

E. Mode 3 Examples

In mode 3, one or more encoders can produce scalable bitstreams that have temporal scalability, spatial scalability and/or SNR scalability in a given component bitstream, and simulcast streams are permitted. In mode 3, mode-2q encoding is applied first for temporal scalability and/or SNR scalability of a component bitstream. For the temporal base layer, temporal enhancement layer(s), and SNR enhancement layer(s), spatial scalability can be applied to further divide the mode-3 streams into multiple spatial resolution layers. A bitstream in the base spatial quality layer conforms to the mode-2q constraints. In a spatial enhancement layer, additional SNR scalability (CGS or MGS) can be applied for more layers. The decoding order is the same as the display order in scalability layers in mode 3.

Two-layer temporal scalability (base temporal layer and one temporal enhancement layer) and two-layer SNR scalability can be extended to have multiple spatial quality layers as follows. A base temporal layer includes intra-coded pictures and predictively-coded pictures (I slices and P slices). Each base layer picture references, at most, the immediately previous picture in the base layer as a reference picture. For example, the pictures of the base temporal layer (base layer overall) are even-numbered pictures 0, 2, 4, 6, . . . . The temporal enhancement layer (enhancement layer 1 overall) includes the odd-numbered pictures 1, 3, 5, 7, and so on, with each odd-numbered picture using the immediately preceding picture of the base temporal layer as a reference picture. The pictures of the base layer and temporal enhancement layer are encoded at a base spatial resolution level and base SNR level.

A first SNR enhancement layer (enhancement layer 2 overall) includes SNR enhancement information (EI slices and EP slices) for the pictures of both the base layer and the temporal enhancement layer. Each I slice or P slice in the base layer or temporal enhancement layer has a corresponding EI slice or EP slice in the first SNR enhancement layer, which may be encoded using spatial prediction from the appropriate I slice or P slice. In addition, EP slices in the SNR enhancement layer can be encoded using temporal prediction from EI or EP slices in the first SNR enhancement layer.

A spatial resolution enhancement layer (enhancement layer 3 overall) includes spatial resolution enhancement information (EI slices and EP slices) for the pictures of the first SNR enhancement layer. Each EI slice or EP slice in the first SNR enhancement layer has a corresponding EI slice or EP slice in the spatial resolution enhancement layer, which may be encoded using spatial prediction from the appropriate EI slice or EP slice of the first SNR enhancement layer. In addition, EP slices in the spatial enhancement layer can be encoded using temporal prediction from EI or EP slices in the spatial enhancement layer.

A second SNR enhancement layer (enhancement layer 4 overall) includes SNR enhancement information (EI slices and EP slices) for the pictures of the spatial enhancement layer. Each EI slice or EP slice in the spatial enhancement layer has a corresponding EI slice or EP slice in the second SNR enhancement layer, which may be encoded using spatial prediction from the appropriate EI slice or EP slice of the spatial enhancement layer. In addition, EP slices in the second SNR enhancement layer can be encoded using temporal prediction from EI or EP slices in the second SNR enhancement layer.

For example, for a stream of 720p video at 30 fps, the base temporal layer is 360p video at 15 fps with a quantization parameter of 38. The temporal enhancement layer is 360p video at 15 fps with a quantization parameter of 38 (30 fps when combined with the base temporal layer). The first SNR enhancement layer is 360p video at 30 fps with a quantization parameter of 34, including EI slices and EP splices for pictures in both the base layer and temporal enhancement layer. The spatial resolution enhancement layer is 720p video at 30 fps with a quantization parameter of 34, including EI slices and EP splices for pictures in the first SNR enhancement layer. The second SNR enhancement layer is 720p video at 30 fps with a quantization parameter of 30, including EI slices and EP splices for pictures in the spatial resolution enhancement layer.

In mode 3, the syntax element PRID in an SVC extension slice header signals the importance of a layer relative to other layers across bitstreams. In general, the value of PRID for the first spatial enhancement layer is the highest value of PRID in the base SNR layer plus one. If additional SNR scalability is introduced inside a given spatial scalability layer, the value of PRID increments by one for each additional SNR layer in the spatial scalability layer, from the lowest to the highest, which may change the PRID for the first spatial enhancement layer. The value of PRID of the second spatial enhancement layer is one plus the highest value of PRID in the first spatial enhancement layer. If additional SNR scalability is introduced, the same rule for assigning the values of PRID applies. The same procedure is applied to higher spatial layers.

In SVC extension slice headers, the values of TID are the same as in the corresponding base layer frames. The value of DID is incremented by one in successive spatial or CGS layers. When additional MGS sub-layers are introduced inside a spatial scalability layer, the value of QID is assigned in the same way as mode 2q. When present, the minimum number of MGS sub-layers in each spatial scalability layer is 2 and the maximum is 4. When additional CGS scalability is introduced inside a spatial scalability layer, the value of DID for the first CGS layer is one plus the value of DID of the base quality layer with the same resolution. The value of DID is incremented by one for additional CGS layers with the same resolution. The value of use_ref_base_pic_flag is 1 for slices that are part of an MGS key picture, and 0 otherwise. The values of output_flag and discardable_flag are 1 for slices associated with the largest value of DID in the coded picture, and 0 otherwise.

For the UC Scalable Constrained High toolset, spatial scalability is restricted to resolution ratios of 1.5 and 2 between successive spatial layers in both horizontal and vertical directions. In mode 3, there are at least two spatial layers (one base and one enhancement spatial layer). Temporal layers follow the rules defined for mode 1, and SNR enhancement layers follow the rules defined for mode 2q.

An MLE bitstream can include multiple independent simulcast mode-3 streams generated from an encoder or encoders. In this case, each independent stream has a different bitrate and is conformant to mode 3 with temporal, SNR and/or spatial resolution scalability modes embedded. The encoder(s) adjust the base-layer value of PRID of each stream in order to signal the importance of the base layer relative to other layers across the streams. The base-layer value of PRID for the lowest bitrate stream is unchanged (equal to 0). The base-layer value of PRID for the next higher bitrate stream is shifted up by one plus the value of PRID for the highest scalability layer in the lowest bitrate stream. The base-layer value of PRID for the rest of the streams is adjusted in a similar manner. Such adjustment assures a unique PRID is associated with each layer in each mode-3 stream, with lower layers being assigned higher priority (that is, lower PRID values) than higher layers in a given mode-3 stream, and with lower bitrate streams being assigned higher priority that higher bitrate streams.

The following table shows an example of two simulcast mode-3 streams with different spatial resolutions, bitrates, and frame rates. Each of the mode-3 streams is temporally scalable and spatially scalable, and the first stream is also SNR scalable. The first stream includes layers for 720p 30 fps video at 1.5 Mbps, and the second stream includes layers for 360p 30 fps video at 600 Kbps. For the 720p stream, there are two temporal scalability layers and two spatial scalability layers, and each of the two spatial layers has a SNR enhancement layer. For the 360p stream, there are two temporal scalability layers and two spatial scalability layers, but there is no SNR scalability. The table also lists PRID values for the layers of the streams for the data units shown in FIG. 24-26.

TABLE 6

Example Simulcast Streams in MLE Mode 3

| | $2^{nd}$ SNR enhancement layer | spatial enhancement layer | $1^{st}$ SNR enhancement layer | temporal enhancement layer | base layer |
|---|---|---|---|---|---|
| simulcast stream 1 | 720p 30 fps quality 2 (PRID 7) | 720p 30 fps quality 1 (PRID 6) | 480p 30 fps quality 1 (PRID 5) | 480p 30 fps quality 0 (PRID 4) | 480p 15 fps quality 0 (PRID 3) |
| simulcast stream 2 | | 360p 30 fps quality 0 (PRID 2) | | 180p 30 fps quality 0 (PRID 1) | 180p 15 fps quality 0 (PRID 0) |

FIGS. 24 and 25 illustrate data units in conformant bitstreams when the two mode-3 streams are transmitted separately (e.g., for different sessions). FIG. 24 shows data units (2400) for the 360p 30 fps mode-3 stream, and FIG. 25 shows data units (2500) for the 720p 30 fps mode-3 stream. FIG. 26 illustrates data units (2600) in a conformant MLE bitstream in which data units for the two mode-3 streams are interleaved (e.g., for a single session).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing system that implements a bitstream multiplexer, a method comprising:
   with the computing system that implements the bitstream multiplexer, multiplexing multiple component bitstreams into a multi-layer encoding (MLE) bitstream, wherein:
      each of the multiple component bitstreams provides an alternative version of input video, each of the multiple component bitstreams being independently decodable to reconstruct its version of the input video;
      each of the multiple component bitstreams is a non-scalable bitstream having a single layer or a scalable bitstream having a base layer and at least one enhancement layer;
      values of picture parameter set identifiers are set to avoid conflicting uses of the values of the picture parameter set identifiers between the multiple component bitstreams in the MLE bitstream, such that each of the values of the picture parameter set identifiers is unique across the multiple component bitstreams, each of the picture parameter set identifiers identifying a picture parameter set; and
      the multiplexing includes inserting marker data units in the MLE bitstream, wherein each of the marker data units includes a priority identifier and one or more quality layer identifiers, the priority identifier associating a video data unit with a given layer of one of the multiple component bitstreams; and
   outputting the MLE bitstream.

2. The method of claim 1 further comprising:
   encoding the input video to produce the multiple component bitstreams; and
   during the encoding, setting the values of the picture parameter set identifiers in the multiple component bitstreams to avoid conflicting uses of the values between the multiple component bitstreams in the MLE bitstream.

3. The method of claim 1 further comprising, with the computing system that implements the bitstream multiplexer:
   receiving the multiple component bitstreams; and
   rewriting one or more of the values of the picture parameter set identifiers in the multiple component bitstreams to avoid conflicting uses of the values between the multiple component bitstreams in the MLE bitstream.

4. The method of claim 3 further comprising, as part of the rewriting, for a given value of the values of the picture parameter set identifiers in the multiple component bitstreams:
   identifying a set of candidate values appropriate for the given value based on number of bits in the given value;
   selecting a new value from the set of candidate values; and
   replacing the given value with the new value.

5. The method of claim 4 wherein the set of candidate values includes one or more candidate values having the number of bits in the given value and multiple candidate values having one or more bytes plus the number of bits in the given value, whereby the rewriting can be performed without bit shifting operations.

6. The method of claim 1 wherein at least one of the multiple component bitstreams is a scalable bitstream having a base layer and at least one enhancement layer, and wherein:

the base layer represents a first temporal resolution of the input video and a given layer of the at least one enhancement layer represents a second temporal resolution higher than the first temporal resolution; and/or the base layer represents a first signal to noise ratio (SNR) level of the input video and a given layer of the at least one enhancement layer represents a second SNR level higher than the first SNR level.

7. The method of claim 6 wherein the alternative versions of the input video are alternative simulcast versions of the input video, such that the multiple component bitstreams provide multiple spatial resolution options between the multiple component bitstreams.

8. The method of claim 1 wherein each of the multiple component bitstreams differs from the other bitstreams of the multiple component bitstreams in terms of one or more of:
  number of layers of temporal, spatial and/or signal to noise ratio (SNR) scalability, if any, supported in that component bitstream;
  format of decoding of the component bitstream; and
  profile and/or level for decoding of the component bitstream.

9. The method of claim 1 wherein the multiplexing enforces multiple composition rules, the multiple composition rules including:
  a first composition rule according to which the priority identifiers identify layers of the multiple component bitstreams, wherein the priority identifiers are included in the marker data units for at least some slice data units;
  a second composition rule according to which each of the multiple component bitstreams is assigned a non-overlapping range of the priority identifiers within which a base layer for the component bitstream has the lowest priority identifier in the range;
  a third composition rule according to which the picture parameter set identifiers are each unique across the multiple component bitstreams; and
  a fourth composition rule according to which sequence parameter set identifiers are each unique across the multiple component bitstreams.

10. The method of claim 1 wherein values of sequence parameter set identifiers are set to avoid conflicting uses of the values of the sequence parameter set identifiers between the multiple component bitstreams in the MLE bitstream, such that each of the values of the sequence parameter set identifiers is unique across the multiple component bitstreams, each of the sequence parameter set identifiers identifying a sequence parameter set.

11. A computing system that implements a bitstream demultiplexer, the computing system including a processor, memory and storage that stores computer-executable instructions for causing the computing system, when programmed thereby, to perform video processing comprising:
  receiving a multi-layer encoding (MLE) bitstream that includes multiple component bitstreams, wherein:
    each of the multiple component bitstreams is a non-scalable bitstream having a single layer or a scalable bitstream having a base layer and at least one enhancement layer;
    at least one of the multiple component bitstreams is a scalable bitstream having a base layer and at least one enhancement layer that provides one or more of temporal scalability and signal to noise ratio (SNR) scalability; and
    each of the multiple component bitstreams provides an alternative simulcast version of input video, such that the multiple component bitstreams provide multiple spatial resolution options between the multiple component bitstreams, each of the multiple component bitstreams being independently decodable to reconstruct its version of the input video;
  demultiplexing at least part of at least one of the multiple component bitstreams from the MLE bitstream, wherein the demultiplexing is based at least in part on marker data units in the MLE bitstream, and wherein each of the marker data units includes a priority identifier and one or more quality layer identifiers, the priority identifier associating a video data unit with a given layer of one of the multiple component bitstreams; and
  outputting the at least part of at least one of the multiple component bitstreams.

12. The computing system of claim 11 wherein the computing system is a multipoint conferencing unit, network server, or receiver.

13. The computing system of claim 11 wherein:
  the base layer represents a first temporal resolution of the input video and a given layer of the at least one enhancement layer represents a second temporal resolution higher than the first temporal resolution; and/or
  the base layer represents a first SNR level of the input video and a given layer of the at least one enhancement layer represents a second SNR level higher than the first SNR level.

14. The computing system of claim 11 wherein the demultiplexing follows multiple decomposition rules, the multiple decomposition rules including:
  a first decomposition rule according to which a base layer for each of the multiple component bitstreams has one of the priority identifiers and one or more zero-value quality layer identifiers;
  a second decomposition rule according to which a given non-base layer of any one of the multiple component bitstreams has one of the priority identifiers that, relative to the priority identifiers of the base layers, indicates one of the multiple component bitstreams for the given non-base layer;
  a third decomposition rule according to which picture parameter set identifiers in slice data units identify corresponding picture parameter set data units; and
  a fourth decomposition rule according to which sequence parameter set identifiers in the corresponding picture parameter sets identify corresponding sequence parameter set data units.

15. One or more computer-readable media storing computer-executable instructions for causing a computing system programmed thereby to perform video processing, wherein the one or more computer-readable media are selected from the group consisting of non-volatile memory, magnetic storage, CD-ROM and DVD, the video processing comprising:
  with the computing system, multiplexing multiple component bitstreams into a multi-layer encoding (MLE) bitstream, wherein:
    each of the multiple component bitstreams is a non-scalable bitstream having a single layer or a scalable bitstream having a base layer and at least one enhancement layer;
    at least one of the multiple component bitstreams is a scalable bitstream having a base layer and at least one enhancement layer that provides one or more of temporal scalability and signal to noise ratio (SNR) scalability;

each of the multiple component bitstreams provides an alternative simulcast version of input video, such that the multiple component bitstreams provide multiple spatial resolution options between the multiple component bitstreams, each of the multiple component bitstreams being independently decodable to reconstruct its version of the input video; and the multiplexing includes inserting marker data units in the MLE bitstream, wherein each of the marker data units includes a priority identifier and one or more quality layer identifiers, the priority identifier associating a video data unit with a given layer of one of the multiple component bitstreams; and outputting the MLE bitstream.

16. The one or more computer-readable media of claim 15 wherein:

the base layer represents a first temporal resolution of the input video and a given layer of the at least one enhancement layer represents a second temporal resolution higher than the first temporal resolution; and/or the base layer represents a first SNR level of the input video and a given layer of the at least one enhancement layer represents a second SNR level higher than the first SNR level.

17. The one or more computer-readable media of claim 15 wherein the multiplexing enforces multiple composition rules, the multiple composition rules including:

a first composition rule according to which the priority identifiers identify layers of the multiple component bitstreams, wherein the priority identifiers are included in the marker data units for at least some slice data units;

a second composition rule according to which each of the multiple component bitstreams is assigned a non-overlapping range of the priority identifiers within which a base layer for the component bitstream has the lowest priority identifier in the range;

a third composition rule according to which picture parameter set identifiers are each unique across the multiple component bitstreams; and a fourth composition rule according to which sequence parameter set identifiers are each unique across the multiple component bitstreams.

18. One or more computer-readable media storing computer-executable instructions for causing a computing system programmed thereby to perform video processing, wherein the one or more computer-readable media are selected from the group consisting of non-volatile memory, magnetic storage, CD-ROM and DVD, the video processing comprising:

receiving a multi-layer encoding (MLE) bitstream that includes multiple component bitstreams, wherein:

each of the multiple component bitstreams provides an alternative version of input video, each of the multiple component bitstreams being independently decodable to reconstruct its version of the input video;

each of the multiple component bitstreams is a non-scalable bitstream having a single layer or a scalable bitstream having a base layer and at least one enhancement layer; and values of picture parameter set identifiers are set to avoid conflicting uses of the values of the picture parameter set identifiers between the multiple component bitstreams in the MLE bitstream, such that each of the values of the picture parameter set identifiers is unique across the multiple component bitstreams, each of the picture parameter set identifiers identifying a picture parameter set;

demultiplexing at least part of at least one of the multiple component bitstreams from the MLE bitstream, wherein the demultiplexing is based at least in part on marker data units in the MLE bitstream, and wherein each of the marker data units includes a priority identifier and one or more quality layer identifiers, the priority identifier associating a video data unit with a given layer of one of the multiple component bitstreams; and outputting the at least part of at least one of the multiple component bitstreams.

19. The one or more computer-readable media of claim 18 wherein each of the multiple component bitstreams differs from the other bitstreams of the multiple component bitstreams in terms of one or more of:

number of layers of temporal, spatial and/or signal to noise ratio (SNR) scalability, if any, supported in that component bitstream;

format of decoding of the component bitstream; and profile and/or level for decoding of the component bitstream.

20. The one or more computer-readable media of claim 18 wherein the demultiplexing follows multiple decomposition rules, the multiple decomposition rules including:

a first decomposition rule according to which a base layer for each of the multiple component bitstreams has one of the priority identifiers and one or more zero-value quality layer identifiers;

a second decomposition rule according to which a given non-base layer of any one of the multiple component bitstreams has one of the priority identifiers that, relative to the priority identifiers of the base layers, indicates one of the multiple component bitstreams for the given non-base layer;

a third decomposition rule according to which picture parameter set identifiers in slice data units identify corresponding picture parameter set data units; and a fourth decomposition rule according to which sequence parameter set identifiers in the corresponding picture parameter sets identify corresponding sequence parameter set data units.

21. The one or more computer-readable media of claim 18 wherein values of sequence parameter set identifiers are set to avoid conflicting uses of the values of the sequence parameter set identifiers between the multiple component bitstreams in the MLE bitstream, such that each of the values of the sequence parameter set identifiers is unique across the multiple component bitstreams, each of the sequence parameter set identifiers identifying a sequence parameter set.

* * * * *